United States Patent
Matsusaka et al.

(10) Patent No.: US 7,145,732 B2
(45) Date of Patent: Dec. 5, 2006

(54) ZOOM OPTICAL SYSTEM, IMAGING LENS UNIT, AND DIGITAL APPARATUS

(75) Inventors: Keiji Matsusaka, Osaka (JP); Soh Ohzawa, Toyonaka (JP)

(73) Assignee: Konica Minolta Opto, Inc., Hachioji (JP)

( * ) Notice: Subject to any disclaimer, the term of this patent is extended or adjusted under 35 U.S.C. 154(b) by 0 days.

(21) Appl. No.: 11/079,594

(22) Filed: Mar. 14, 2005

(65) Prior Publication Data

US 2005/0231817 A1    Oct. 20, 2005

(30) Foreign Application Priority Data

Mar. 31, 2004    (JP)    .............................. 2004-106241

(51) Int. Cl.
  *G02B 15/14*    (2006.01)
(52) U.S. Cl. .................. 359/689; 359/686; 359/676
(58) Field of Classification Search ................ 359/689, 359/686, 676
  See application file for complete search history.

(56) References Cited

U.S. PATENT DOCUMENTS

| | | | |
|---|---|---|---|
| 5,132,838 A | 7/1992 | Ohshita | 359/432 |
| 5,357,374 A | 10/1994 | Ohno | 359/689 |
| 6,515,805 B1 | 2/2003 | Hagimori | 359/691 |
| 6,532,114 B1 * | 3/2003 | Kohno et al. | 359/689 |
| 6,735,020 B1 * | 5/2004 | Sekita | 359/682 |
| 6,853,497 B1 * | 2/2005 | Yoneyama | 359/689 |

FOREIGN PATENT DOCUMENTS

| | | |
|---|---|---|
| JP | 2001-21806 A | 1/2001 |
| JP | 2003-177314 A | 6/2003 |

* cited by examiner

*Primary Examiner*—Scott J. Sugarman
*Assistant Examiner*—Darryl J. Collins
(74) *Attorney, Agent, or Firm*—Sidley Austin LLP

(57) ABSTRACT

In a zoom optical system for forming an optical image of an object onto a light receiving plane of an image sensor for converting the optical image into an electrical signal, and performing zooming by varying distances between a first lens group and a second lens group, and between the second lens group and a third lens group in an optical axis direction, the zoom optical system includes: the first lens group having a negative optical power; the second lens group having a positive optical power; and the third lens group having a positive optical power, wherein the first lens group is composed of two or more lens elements including at least one positive lens element and at least one negative lens element, the second lens group is composed of two or more lens elements including at least one positive lens element and at least one negative lens element, and all the lens elements in the first lens group are made of a plastic material.

6 Claims, 21 Drawing Sheets

LONGITUDINAL
SPHERICAL ABERRATION
(W)

ASTIGMATISM

DISTORTION (M)

(T)

LONGITUDINAL SPHERICAL ABERRATION
(W)

ASTIGMATISM

DISTORTION (M)

(T)

LONGITUDINAL
SPHERICAL ABERRATION

ASTIGMATISM

DISTORTION

LONGITUDINAL SPHERICAL ABERRATION (W)

ASTIGMATISM

DISTORTION (M)

(T)

LONGITUDINAL SPHERICAL ABERRATION (W)

ASTIGMATISM

DISTORTION (T)

LONGITUDINAL SPHERICAL ABERRATION (W)

ASTIGMATISM

DISTORTION (M)

(T)

LONGITUDINAL SPHERICAL ABERRATION
(W)

ASTIGMATISM

DISTORTION (M)

(T)

LONGITUDINAL
SPHERICAL ABERRATION (W)

ASTIGMATISM

DISTORTION (M)

(T)

FIG. 19A
LONGITUDINAL SPHERICAL ABERRATION (W)

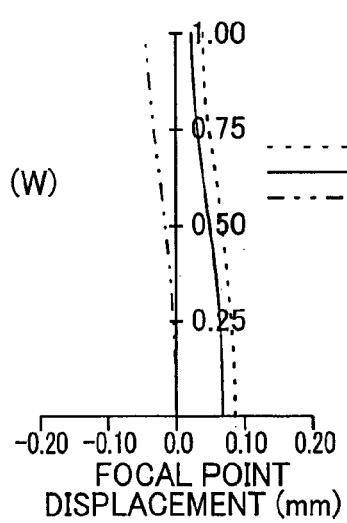

— — — 656.2700 nm
——— 587.5600 nm
— · — 435.8300 nm

FOCAL POINT DISPLACEMENT (mm)

FIG. 19B
ASTIGMATISM
IMAGE HEIGHT (mm)

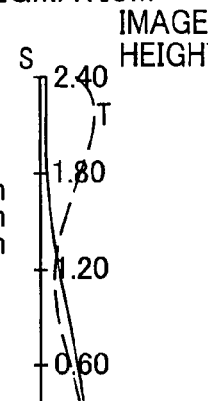

FOCAL POINT DISPLACEMENT (mm)

FIG. 19C
DISTORTION
IMAGE HEIGHT (mm)

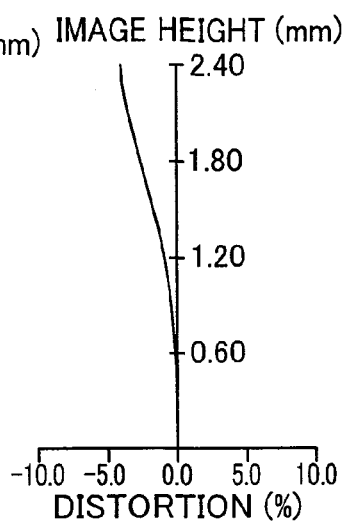

DISTORTION (%)

FIG. 19D (M)

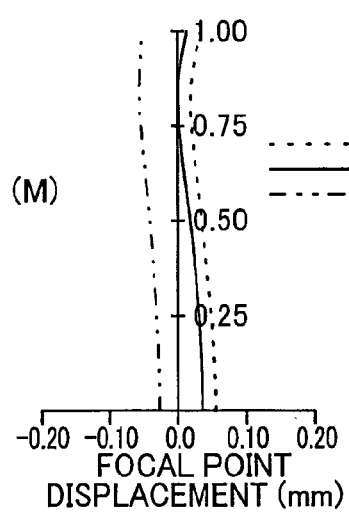

— — — 656.2700 nm
——— 587.5600 nm
— · — 435.8300 nm

FOCAL POINT DISPLACEMENT (mm)

FIG. 19E
IMAGE HEIGHT (mm)

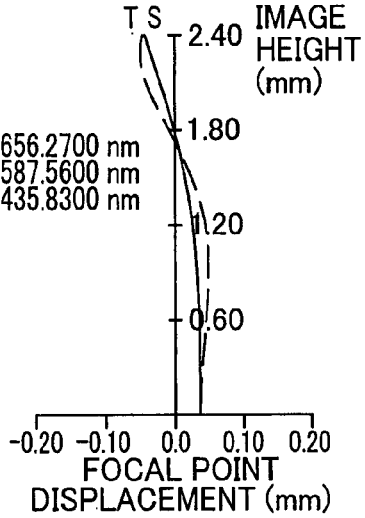

FOCAL POINT DISPLACEMENT (mm)

FIG. 19F
IMAGE HEIGHT (mm)

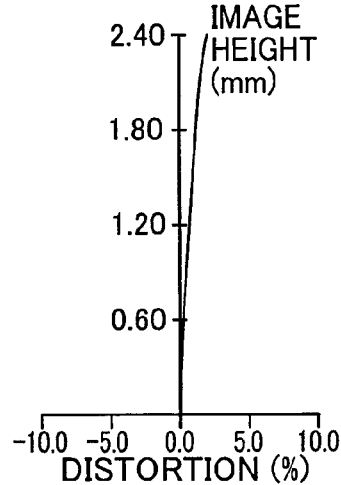

DISTORTION (%)

FIG. 19G (T)

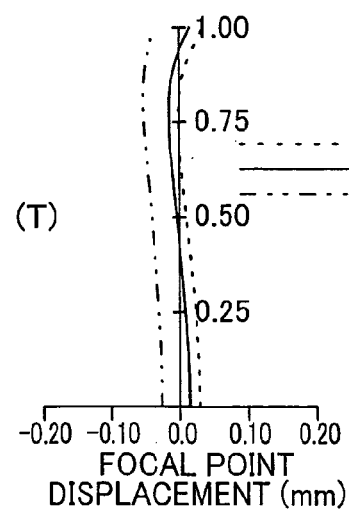

— — — 656.2700 nm
——— 587.5600 nm
— · — 435.8300 nm

FOCAL POINT DISPLACEMENT (mm)

FIG. 19H
IMAGE HEIGHT (mm)

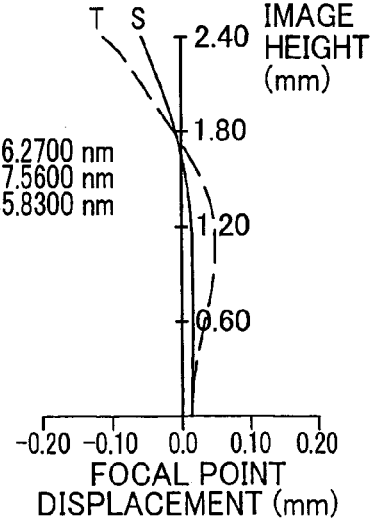

FOCAL POINT DISPLACEMENT (mm)

FIG. 19I
IMAGE HEIGHT (mm)

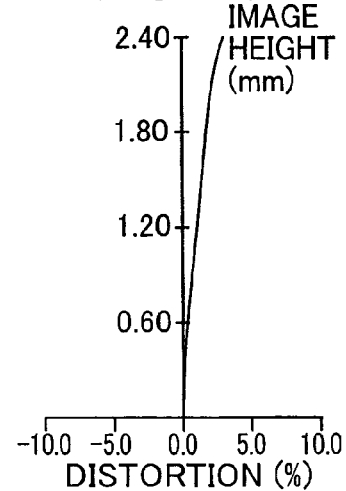

DISTORTION (%)

FIG. 21A
FIG. 21B
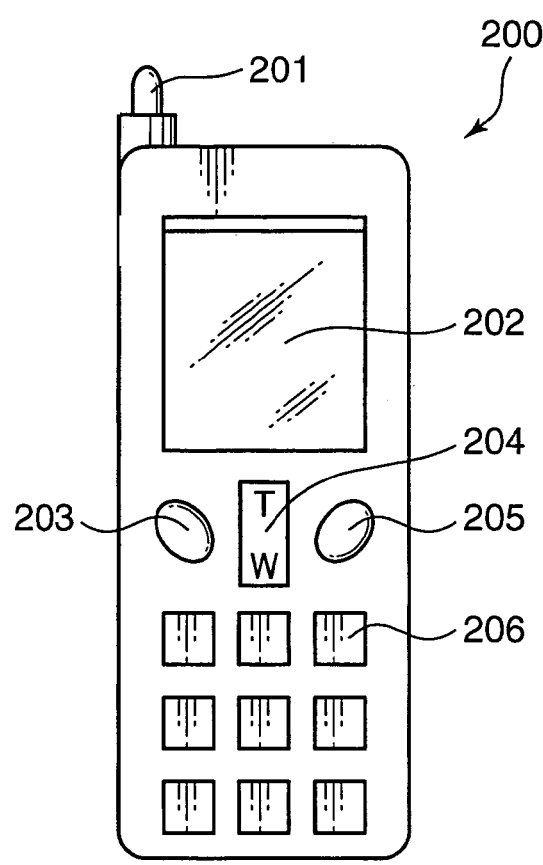
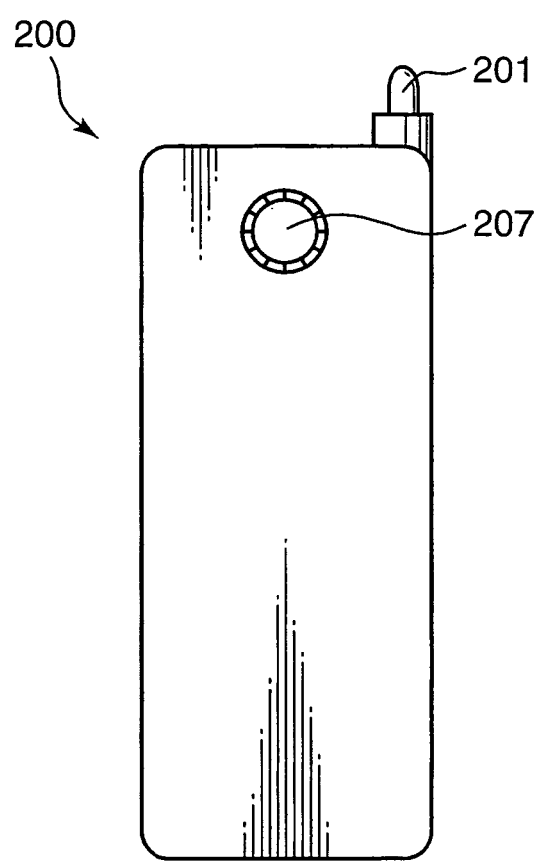

ZOOM OPTICAL SYSTEM, IMAGING LENS UNIT, AND DIGITAL APPARATUS

This application is based on Japanese Patent Application No. 2004-106241 filed on Mar. 31, 2004, the contents of which are hereby incorporated by reference.

BACKGROUND OF THE INVENTION

1. Field of the Invention

The present invention relates to a zoom optical system composed of plural lens groups and adapted for performing zooming by varying the distances between the respective lens groups in an optical axis direction, as well as to an imaging lens unit with the zoom optical system, and a digital apparatus loaded with the imaging lens unit.

2. Description of the Related Art

In recent years, with an explosive spread of a mobile phone and a personal digital assistant (PDA), compact digital still camera units or digital video units have been built in most of these apparatuses. In the apparatuses incorporated with the digital still camera units or the digital video units, a compact image sensor with a small number of pixels, as compared with an image sensor equipped in a digital still camera dedicatedly used for photographing, and an imaging lens unit equipped with a mono-focal optical system constituted of one to three plastic lens elements are generally used, considering severe constraints in size and cost required in such apparatuses.

Since the magnification of the mono-focal optical system is substantially in the same level as a human eye, an object to be photographed is required to be set as close as possible to the photographer. In current days when use of an image sensor with a large number of pixels and high performance has been progressed drastically, there is a demand for a compact zoom optical system that is compatible with an image sensor with a large number of pixels, enables a user (photographer) to photograph an object sufficiently away therefrom, and is loadable in a mobile phone or a like apparatus.

As an example of a compact zoom optical system, Japanese Unexamined Patent Publication No. 2001-21806 (hereinafter, called as "D1") and U.S. Pat. No. 6,515,805 (hereinafter, called as "D2") propose a zoom optical system of a so-called negative-positive two-unit type comprising a first lens group having a negative optical power, and a second lens group having a positive optical power in this order from the object side. U.S. Pat. No. 5,357,374 (hereinafter, called as "D3") proposes a zoom optical system of a negative-positive-negative three-unit type, wherein all the lens elements of the optical system are made of a plastic material for realizing a further compact and inexpensive optical system. A further recent technology achieved a zoom optical system of a negative-positive-positive three-unit type, which is conceived to be most advantageous for miniaturizing the optical system. An example of the advanced technology is recited in Japanese Unexamined Patent Publication No. 2003-177314 (hereinafter, called as "D4"), which is directed to a compact zoom optical system having a less number of lens elements ranging from two to four. Further, U.S. Pat. No. 6,735,020 (hereinafter, called as "D5") proposes a zoom optical system, wherein a half or more than half of the total number of lens elements are plastic lens elements in an attempt to improve productivity of the optical system.

An example of an optical system other than the aforementioned optical system to be incorporated in an imaging lens unit is recited in U.S. Pat. No. 5,132,838 (hereinafter, called as "D6"). D6 is directed to a compact zoom viewfinder optical system having objective lens groups of a negative-positive-positive three-group type. The objective optical system adopts typical movements of lens groups in a zoom optical system of a negative-positive-positive three-unit type, wherein the first lens group makes a u-turn, the second lens group is linearly moved spaced apart from the first lens group by a certain distance, and the third lens group is fixed (unmoved) during zooming from the wide-angle end to the telephoto end.

It is difficult to perform various aberration corrections in the two-unit type zoom optical system as proposed in D1 or D2, and it is difficult or impossible to apply the two-unit type zoom optical system to a recently developed image sensor with a large number of pixels. Furthermore, in D1, although all the lens elements are made of a plastic material, the entire length of the optical system is long because of the two-unit arrangement, and the moving distances of the first lens group and the second lens group in zooming are also large, which makes it difficult to miniaturize the entire construction of the imaging lens unit including the optical system. Since the optical system proposed in D3 has an arrangement that each of the lens groups is composed of a single lens element, aberration correction within each of the lens groups is insufficient, and the aberration of the optical system as a whole is large. Particularly, since the second lens group adapted for zooming has a strong optical power, constituting the second lens group of a single lens element is not desirable in correcting axial chromatic aberration. In addition to the demerit, the F-number is as large as about 7 to 10, which means less light is admitted. In D4, the first lens group and the third lens group each is composed of a single lens element, which results in insufficient aberration correction. In D5, the number of lens elements used in the optical system is as large as 7 or 8, in addition to the use of the glass lens elements. Thus, the entire length of the optical system is long, and there is room for improvement in terms of the size and the cost.

The objective optical system proposed in D6, which is an optical system other than the optical system to be incorporated in the imaging lens unit, has a feature that all the lens elements constituting the second lens group have a positive optical power, and accordingly, chromatic aberration correction is insufficient. Furthermore, since the entire length of the objective optical system is long, and distortion aberration correction is insufficient, it is difficult to incorporate the objective optical system in the imaging lens unit in the aspect of miniaturization and optical performance.

As mentioned above, the conventional zoom optical systems have suffered from the drawbacks that designing the optical system in an attempt to be compatible with an image sensor having a large number of pixels may unduly increase the number of lens elements and make the entire length of the optical system long. It is advantageous to use a glass lens element, particularly, an aspherical glass lens element in order to produce a compact and high resolution optical system. However, use of the aspherical glass lens element may increase the weight of the optical system and lead to production cost rise. Furthermore, high precision in processing is required in fabricating the aspherical glass lens element, which is not feasible in mass production. Additionally, the following matter should be considered. Generally, the moving distance of a lens group in a zoom optical system is large, as compared with an auto-focusing system having a movable lens section as in the case of the zoom optical system. If the weight of the optical system to be driven by a lens driver is increased by the weight corresponding to the glass lens element(s), the size of the lens driver is increased in order to securely move the lens groups. It is desirable to use as many plastic lens elements as possible, considering the cost and the weight of the optical system. However, use of the plastic lens element may encounter many disadvantages such as small optical power, difficulty in miniaturizing the optical system, difficulty in chromatic aberration correction, and a large back focus variation with environmental temperature change. Furthermore, error sensitivity of the lens group adapted for zooming may be unduly increased, as the optical system is miniaturized. This is true in both of the optical systems with the glass lens element and with the plastic lens element. Accordingly, adjustment regarding the lens groups is required. Thus, the conventional art failed to achieve a compact and inexpensive zoom optical system which is compatible with an image sensor with a large number of pixels, and is capable of being built in a compact mobile phone or a PDA.

SUMMARY OF THE INVENTION

In view of the problems residing in the prior art, it is an object of the present invention to provide an arrangement that enables to reduce the load of a lens driver by reducing the weight of a movable lens group, and miniaturize an optical system.

It is another object of the present invention to provide an arrangement that enables to suppress error sensitivity without use of an aspherical glass lens element, which may lead to production cost rise, by combining plural lens elements, and that does not need adjustment regarding lens groups.

It is still another object of the present invention to provide a compact and inexpensive zoom optical system that is compatible with an image sensor with a large number of pixels such as 2 million pixels or more, and that does not need a process such as interpolation for acquiring an enlarged image, which is required in a so-called electronic zoom system.

An aspect of the present invention is directed to a zoom optical system for forming an optical image of an object onto a light receiving plane of an image sensor for converting the optical image into an electrical signal and performing zooming by varying distances between lens groups in an optical axis direction. The zoom optical system comprises the lens groups including in the order from an object side: a first lens group having a negative optical power; a second lens group having a positive optical power; and a third lens group having a positive optical power, wherein the first lens group is composed of two or more lens elements including at least one positive lens element and at least one negative lens element, the second lens group is composed of two or more lens elements including at least one positive lens element and at least one negative lens element, and all the lens elements in the first lens group are made of a plastic material.

Another aspect of the present invention is directed to a zoom optical system for forming an optical image of an object, and performing zooming by varying distances between lens groups in an optical axis direction. The zoom optical system comprises the lens groups constituted of a first lens group, a second lens group, and a third lens group in the order from an object side. The first lens group has a negative optical power and is composed of a positive lens element and a negative lens element. All the lens elements in the first lens group are made of a plastic material. The second lens group has a positive optical power and is composed of a positive lens element and a negative lens element. The third lens group has a positive optical power.

Yet another aspect of the present invention is directed to an imaging lens unit comprising: a zoom optical system for forming an optical image of an object, and performing zooming by varying distances between lens groups including a first lens group, a second lens group, and a third lens group in an optical axis direction; an image sensor for converting the optical image formed by the zoom optical system into an electrical signal; and a focusing mechanism for focusing by moving the first lens group or the third lens group, wherein the zoom optical system includes in the order from the object side: the first lens group having a negative optical power and being composed of two or more lens elements having at least one positive lens element and at least one negative lens element, all the lens elements in the first lens group being made of a plastic material, the second lens group having a positive optical power and being composed of two or more lens elements having at least one positive lens element and at least one negative lens element, and the third lens group having a positive optical power.

Still another aspect of the present invention is directed to a digital apparatus comprising: the aforementioned imaging lens unit; and a functioning section for executing a still image shooting and/or a moving image shooting of the object.

These and other objects, features and advantages of the present invention will become more apparent upon reading of the following detailed description along with the accompanying drawings.

BRIEF DESCRIPTION OF THE DRAWINGS

FIGS. 19A through 19I are aberration diagrams regarding spherical aberration, astigmatism, and distortion aberration of the lens groups in the zoom optical system as the ninth embodiment.

FIG. 21A is an illustration exemplifying a camera phone loaded with the zoom optical system embodying the present invention, specifically showing an operating face (front face) of the camera phone.

FIG. 21B is an illustration exemplifying the camera phone loaded with the zoom optical system embodying the present invention, specifically showing a back face of the camera phone.

DETAILED DESCRIPTION OF THE PREFERRED EMBODIMENTS

Figure 1:
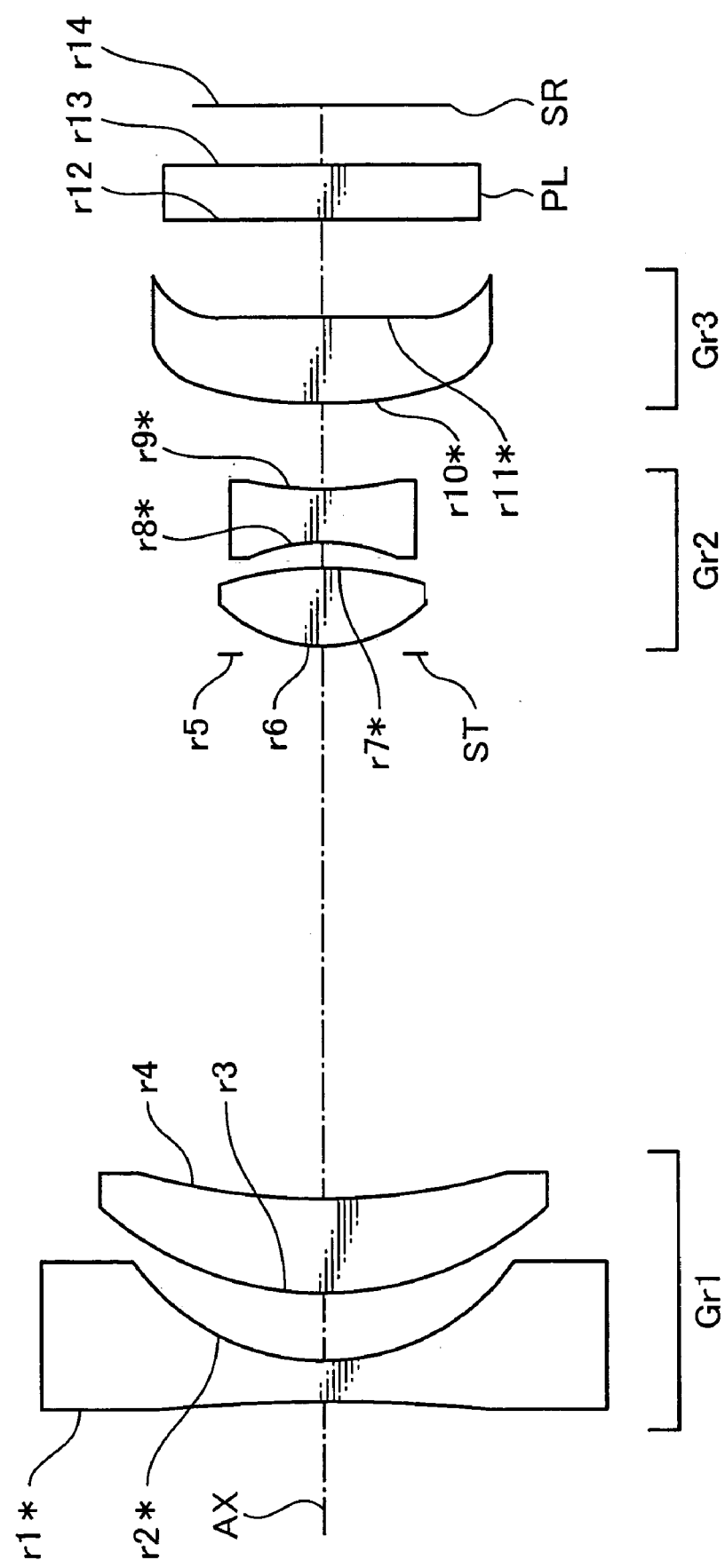
FIG. 1 is a cross-sectional view taken along an optical axis, showing a zoom optical system as a first embodiment of the present invention.

FIGS. 21A and 21B are illustrations each showing an external appearance of a mobile phone equipped with a camera (hereinafter, simply called as "camera phone"), as an embodiment of a digital apparatus in accordance with the present invention. The digital apparatus in accordance with the present invention includes, in addition to the camera phone, a digital still camera, a digital video camera, a personal digital assistant (PDA), a personal computer, a mobile computer, and peripheral devices thereof. The digital still camera and the digital video camera are examples of an imaging lens unit for optically reading video of an object, converting the video into an electrical signal with use of a semiconductor device, and storing the electrical signal as digital data into a storage medium such as a flash memory. The present invention also embraces a mobile phone, a PDA, a personal computer, a mobile computer, and peripheral devices thereof, in each of which the compact imaging lens unit for optically reading a still image or a moving image (video) of an object is incorporated.

FIG. 21A shows the front face (operating face) of the camera phone, and FIG. 21B shows the back face of the camera phone, which is opposite to the operating face. Referring to FIG. 21A, a phone body 200 has an antenna 201 at an upper part thereof, and includes on the operating face, a display 202, a mode switching button 203 for activating image shooting mode and switching over the mode between still image shooting and moving image shooting, a zoom button 204 for controlling zooming, which is a feature of the present invention, a shutter button 205, and a dial button 206. The symbol "T" indicating the telephoto end of the camera is marked on an upper end portion of the zoom button 204, and the symbol "W" indicating the wide-angle end of the camera is marked on a lower end portion of the zoom button 204. The zoom button 204 is constituted of a two-contact switch constructed such that telephoto shooting or wide-angle shooting is allowed when a photographer (user) selectively depresses the upper end portion or the lower end portion of the zoom button 204. Further, an imaging lens unit (camera) 207 equipped with a zoom optical system, which is a feature of the present invention, is built in the phone body 200, with a taking lens being exposed out of the back face of the phone body 200.

When the photographer depresses the mode switching button 203, the image shooting mode is activated. In the embodiment of the present invention, depressing the mode switching button 203 one time activates the still image shooting mode, and depressing the mode switching button 203 one more time while the camera is in the still image shooting mode switches over the mode from the still image shooting to the moving image shooting. When the still image shooting mode is activated, an object image is captured by an image sensor such as a CCD sensor through the imaging lens unit 207. Then, after the acquired object image data is transferred to a memory for display, the image is displayed on the display 202. The photographer can move the object image to a desired position within the display screen while viewing the image through the display 202. When the photographer depresses the shutter button 205 with the object image being located at the desired position, a still image of the object is obtained. Thus, image data representing the object still image is stored in a memory for storing still image data.

When zoom shooting is performed in the case where the object is located away from the photographer, or the photographer wishes to photograph the object enlargedly, the photographer depresses the upper end portion of the zoom button 204 where the symbol "T" is marked. Then, the state that the zoom button 204 is being depressed toward the telephoto end is detected, and a lens driving for zooming is executed for a time duration while the zoom button 204 is depressed to carry out continuous zooming. If the photographer wishes to reduce the magnification of the object image to low magnification, for example, in an excessive zooming, the photographer depresses the lower end portion of the zoom button 204 where the symbol "W" is marked. Then, the state that the zoom button 204 is being depressed toward the wide-angle end is detected, and a continuous zooming toward low magnification is carried out for a time duration while the zoom button 204 is depressed. In this way, the photographer can vary the zoom ratio with use of the zoom button 204, even if the object is located away from the photographer. Similarly to ordinary shooting, the photographer can capture an enlarged still image by moving the object image within the display screen to a desired position, and by depressing the shutter button 205 with the object image being located at the desired position.

In case of conducting moving image shooting, after the still image shooting mode is activated by depressing the mode switching button 203 one time, the mode switching button 203 is depressed once again to change the image shooting mode to the moving image shooting. Thereafter, similarly to the still image shooting, the photographer views the image through the display 202 to move the object image captured through the imaging lens unit 207 to a desired position within the display screen. While viewing the image through the display 202, the photographer can adjust the zoom ratio of the object image with use of the zoom button 204. After adjusting the zoom ratio of the object image, the photographer can start moving image shooting by depressing the shutter button 205. During the moving image shooting, the photographer can vary the zoom ratio of the object image desirably by manipulating the zoom button 204. When the photographer depresses the shutter button 205 again in this state, the moving image shooting is terminated. The captured moving image data is sent to a memory for displaying the moving image on the display 202, and is also sent to a memory for storing the moving image data for storage.

The construction of the zoom button 204, which is a feature of the present invention, is not limited to the foregoing. The dial button 206 may be used as a zoom button. Alternatively, usable is a member having two-directional zooming function, namely, enlargement and reduction, such as a rotary dial member which is rotatably supported about an axis of rotation on the operating face where the dial button is installed.

The present invention is not limited to the camera phone, and is applicable to other digital apparatuses such as a digital still camera, a digital video camera, a PDA, a personal computer, a mobile computer, and peripheral devices thereof.

The imaging lens unit 207 shown in FIG. 21B, which is a feature of the present invention, is constituted of a lens assembly for forming an optical image of an object, a plane-parallel plate corresponding to an optical low-pass filter or a like element, and an image sensor for converting the optical image formed by the lens assembly into an electrical signal in this order from the back side of the phone body 200, namely, from the object side. There is a strong demand for a compact zoom optical system with high zooming performance, as the lens assembly, so that a photographer can photograph an object sufficiently away therefrom. The zoom optical system is such that plural lens groups constitute the lens assembly, and zooming and focusing are conducted by varying the distances between the respective lens groups in the optical axis direction. The present invention relates to the zoom optical system, the imaging lens unit having a mechanism for driving the lens groups in the zoom optical system independently of each other for focusing, and the digital apparatus which is incorporated with the imaging lens unit and an image sensor, and which has a function of performing still image or moving image shooting.

In the following, the zoom optical system constituting the imaging lens unit 207 of the camera phone shown in FIG. 21B is described referring to the drawings.

[First Embodiment]

FIG. 1 is a cross-sectional view taken along an optical axis (AX), showing an arrangement of lens groups in a zoom optical system as a first embodiment of the present invention. FIGS. 2 through 9 each show a lens group arrangement at a wide-angle end (W), as well as FIG. 1. The lens groups in each of the first through ninth embodiments of the present invention are constituted of a first lens group (Gr1) having a negative optical power as a whole, a second lens group (Gr2) having a positive optical power as a whole, and a third lens group (Gr3) having a positive optical power as a whole in this order from the object side, namely, from the left side in FIGS. 1 through 9. As will be described later, an aperture stop (ST) for adjusting the light amount is included in the second lens group (Gr2) on the side of the first lens group (Gr1) in the first through eighth embodiments, and is included in the second lens group (Gr2) on the side of the third lens group (Gr3) in the ninth embodiment. Further, a plane-parallel plate (PL) and an image sensor (SR) are arranged adjacent to the third lens group (Gr3), opposite to the second lens group (Gr2).

Hereinafter, the terms "concave", "convex", and "meniscus" are used regarding lens elements. It should be noted that these terms represent the respective configurations of a lens element in the vicinity of the optical axis, namely, near the central part of the lens element, and do not indicate the respective configurations of the entirety of the lens element or a periphery of the lens element. As far as the lens element is a spherical lens element, the configuration of the lens element does not matter. However, since the configuration of an aspherical lens element is generally different in the vicinity of the central part thereof and in a periphery thereof, the above definitions on the terms are necessary.

The zoom optical system as the first embodiment shown in FIG. 1 has the following lens group arrangement in the order from the object side. The first lens group (Gr1) having a negative optical power as a whole is composed of a negative biconcave lens element, and a positive meniscus lens element convex to the object side. The second lens group (Gr2) having a positive optical power as a whole is composed of an aperture stop ST, a positive biconvex lens element, and a negative biconcave lens element. The third lens group (Gr3) having a positive optical power as a whole is composed of a single positive biconvex lens element. Further, ri (i=1, 2, 3, . . . ) indicates the i-th lens surface from the object side, and a surface ri marked with an asterisk (*) is an aspherical surface.

In the above arrangement, an incident ray from the object side is propagated through the first through third lens groups (Gr1, Gr2, Gr3) in this order, and forms an optical image of an object. The optical image formed through the lens groups is propagated through the plane-parallel plate (PL) arranged adjacent the third lens group (Gr3). While the optical image reaches the plane-parallel plate (PL), the optical image is corrected to minimize a so-called aliasing noise, which may appear during conversion of the optical image into an electrical signal by the image sensor (SR). The plane-parallel plate (PL) corresponds to an optical low-pass filter, an infrared ray cutting filter, a cover glass for an image sensor, or the like. After the correction by the plane-parallel plate (PL), the optical image is converted into an electrical signal by the image sensor (SR). The electrical signal is subjected to a predetermined digital image processing, image compression, or a like processing, according to needs, and is recorded in a memory of a mobile phone, a PDA, or a like apparatus, as a digital video signal, or transmitted to another digital apparatus by way of a cable or through radio.

Figure 9:
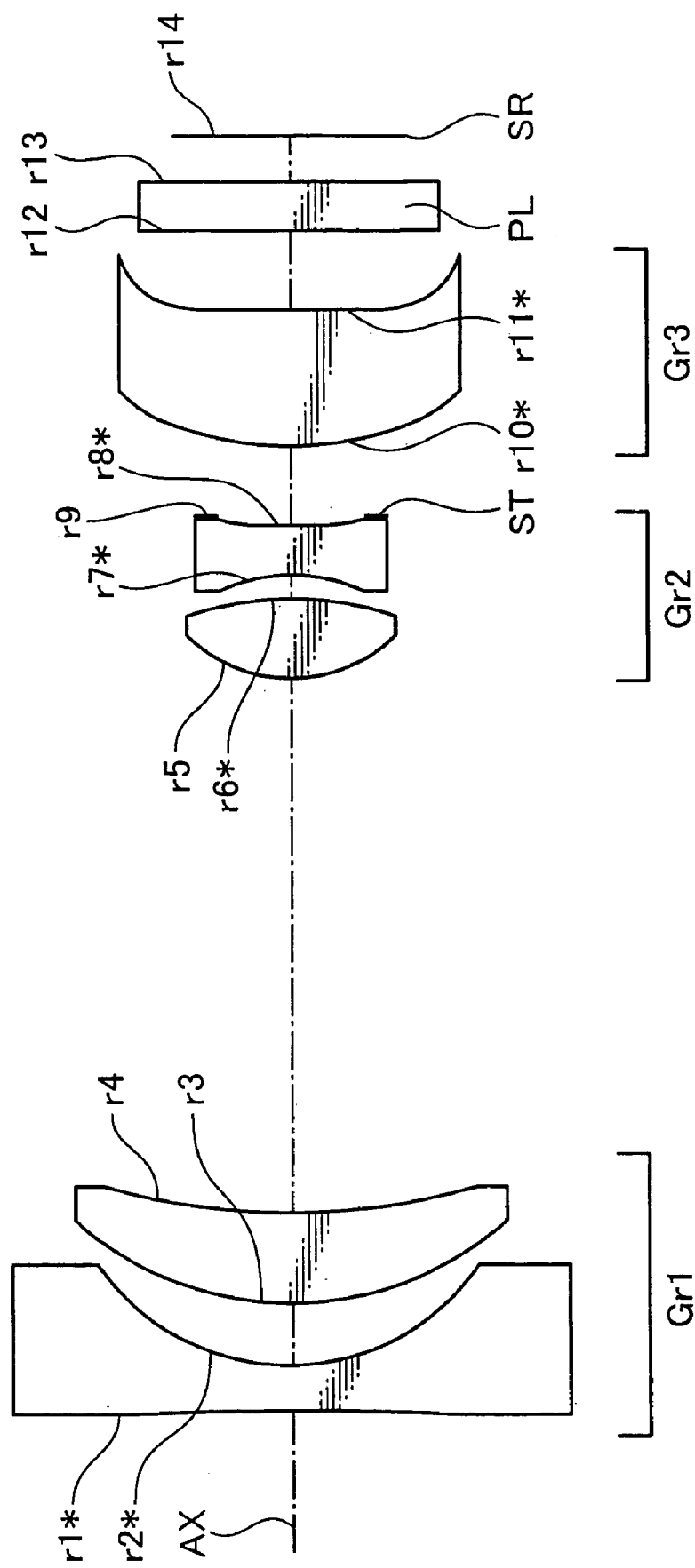
FIG. 9 is a cross-sectional view taken along an optical axis, showing a zoom optical system as a ninth embodiment of the present invention.
Figure 10A:
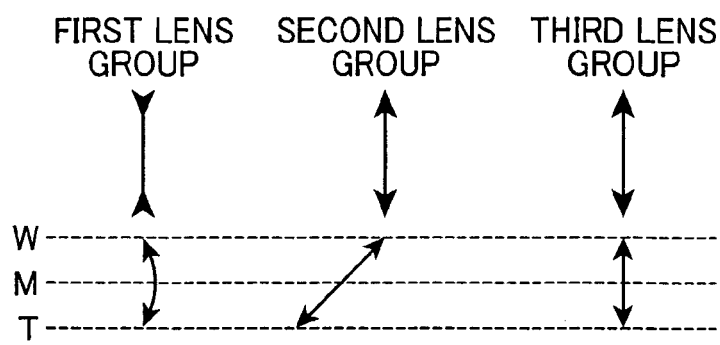
FIGS. 10A through 10E are illustrations showing how lens groups are moved in the zoom optical systems of the first through the ninth embodiments.
Figure 10B:
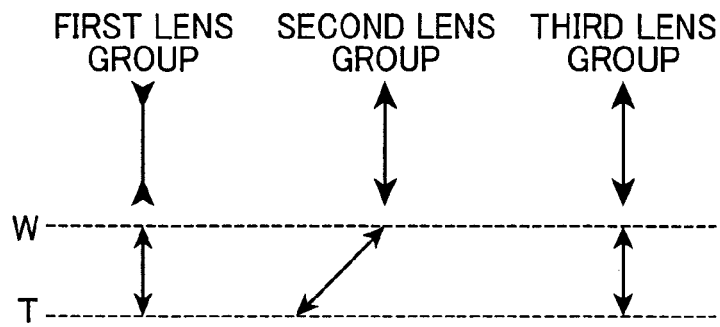
Figure 10C:
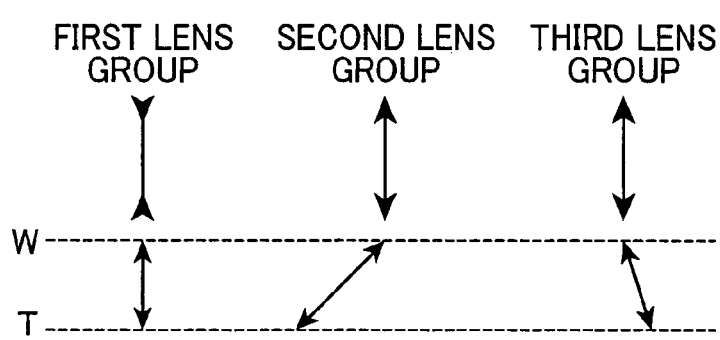
Figure 10D:
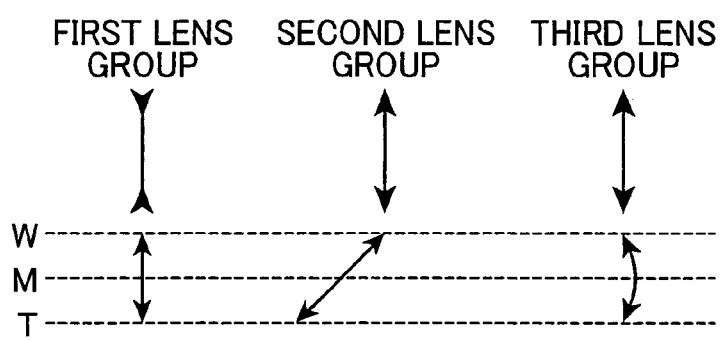
Figure 10E:
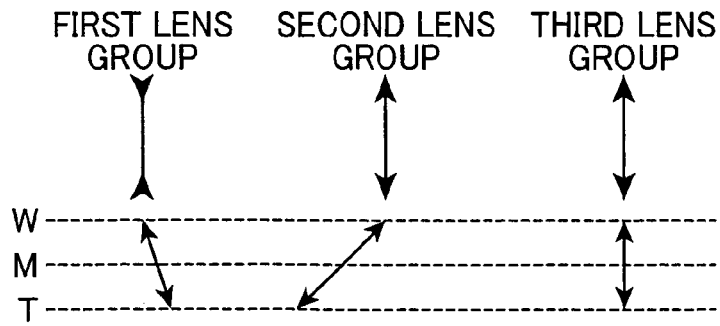
Figure 11A:
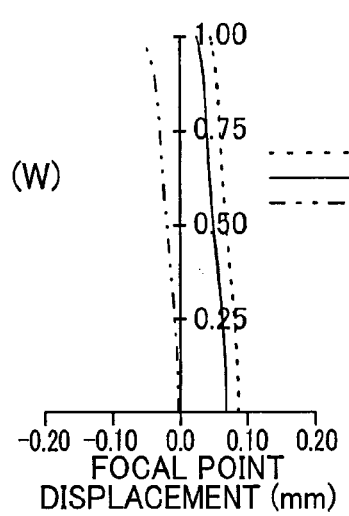
FIGS. 11A through 11I are aberration diagrams regarding spherical aberration, astigmatism, and distortion aberration of the lens groups in the zoom optical system as the first embodiment.
Figure 11B:
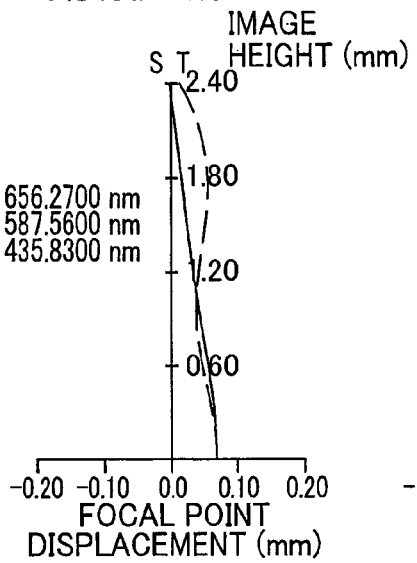
Figure 11C:
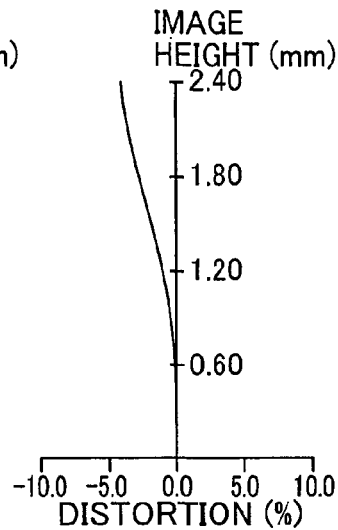
Figure 11D:
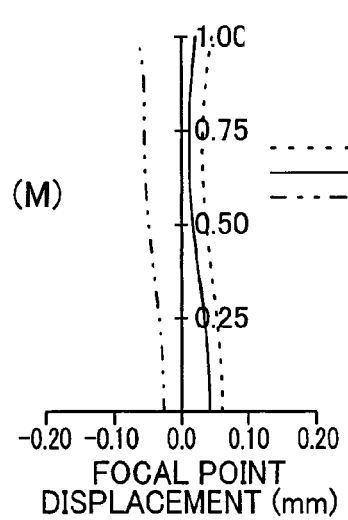
Figure 11E:
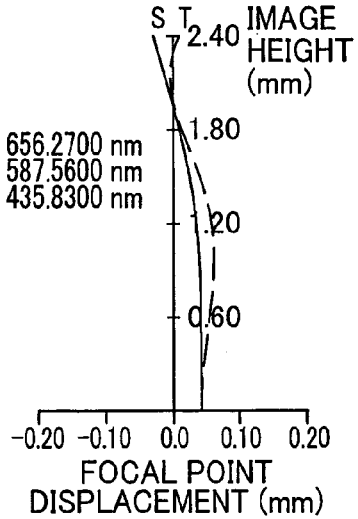
Figure 11F:
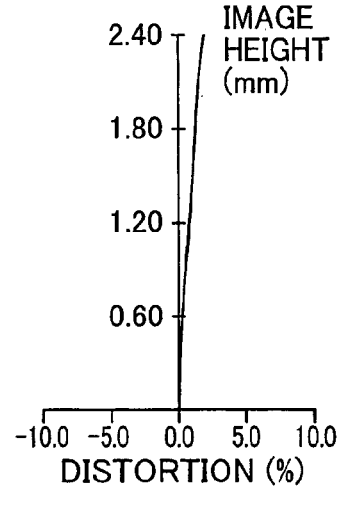
Figure 11G:
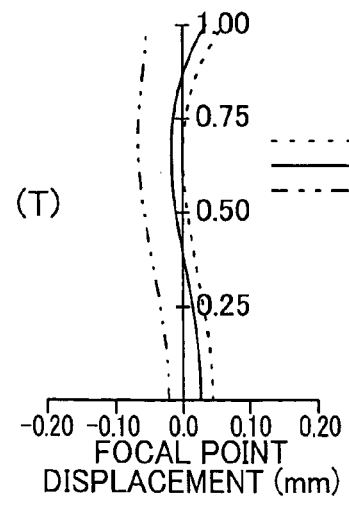
Figure 11H:
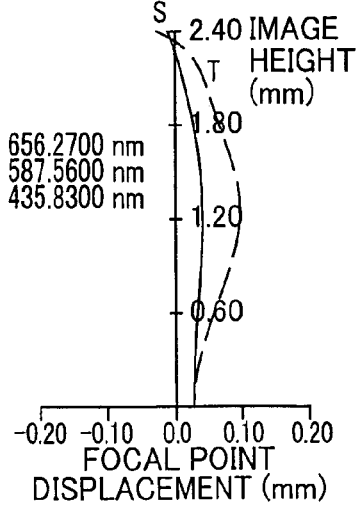
Figure 11I:
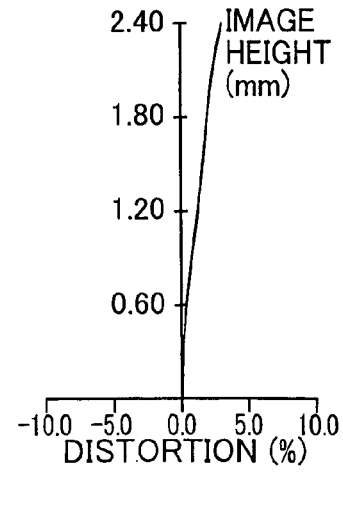
Figure 12A:
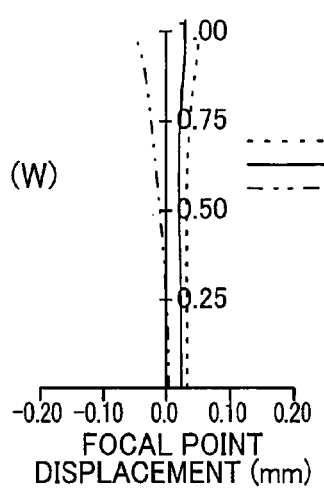
FIGS. 12A through 12I are aberration diagrams regarding spherical aberration, astigmatism, and distortion aberration of the lens groups in the zoom optical system as the second embodiment.
Figure 12B:
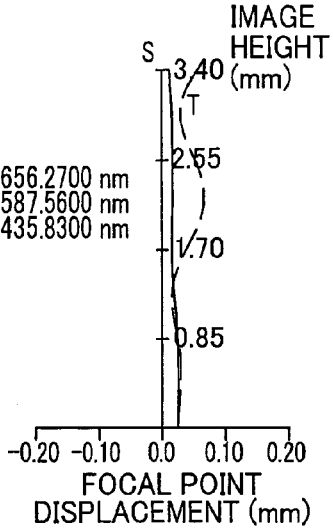
Figure 12C:
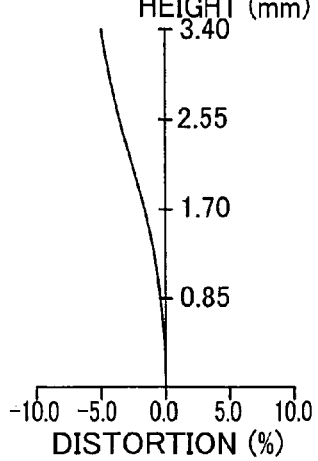
Figure 12D:
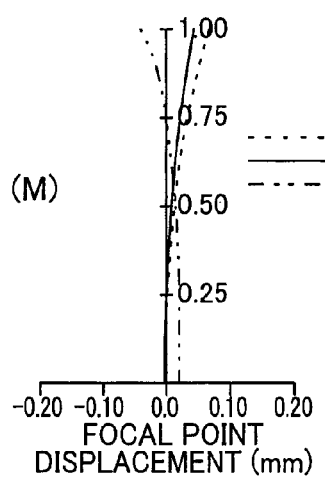
Figure 12E:
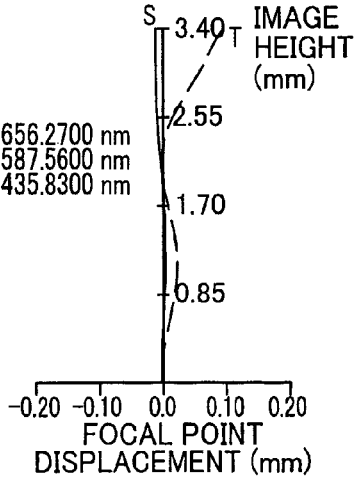
Figure 12F:
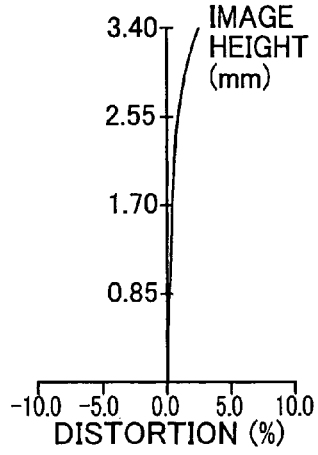
Figure 12G:
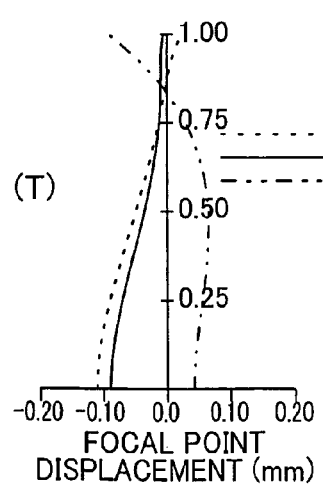
Figure 12H:
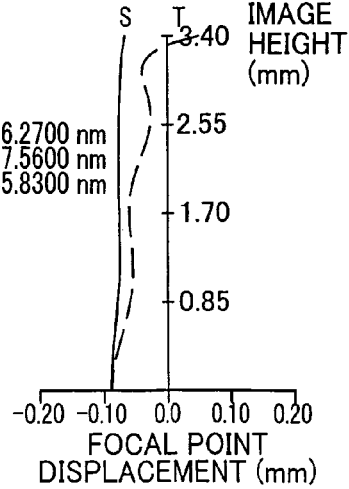
Figure 12I:
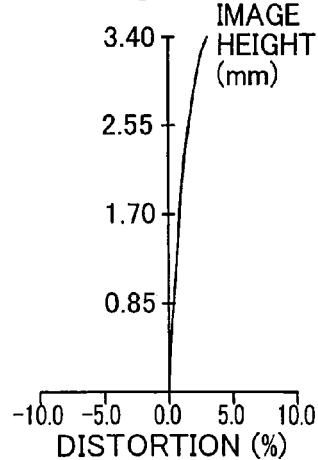
Figure 13A:
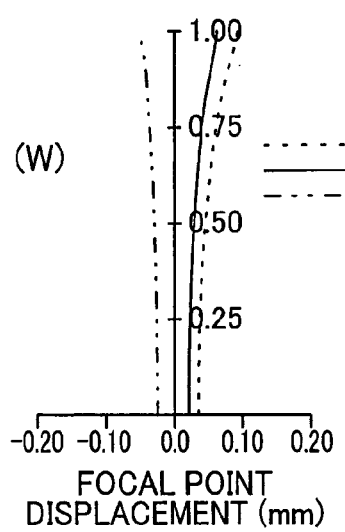
FIGS. 13A through 13F are aberration diagrams regarding spherical aberration, astigmatism, and distortion aberration of the lens groups in the zoom optical system as the third embodiment.
Figure 13B:
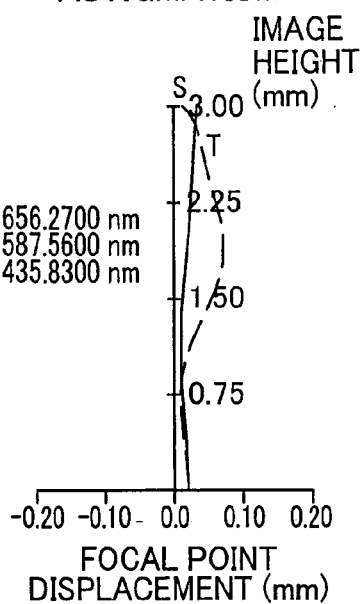
Figure 13C:
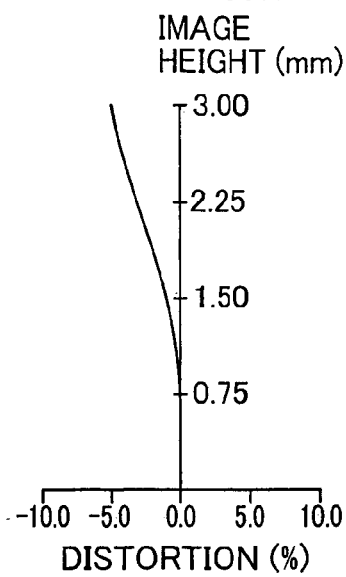
Figure 13D:
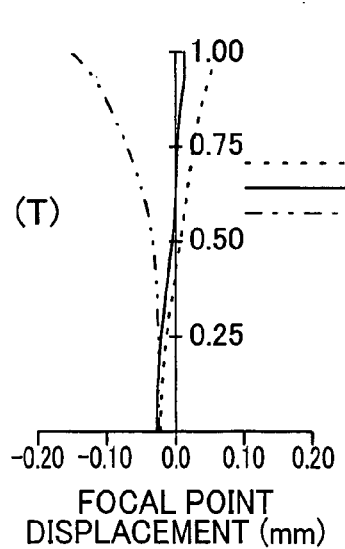
Figure 13E:
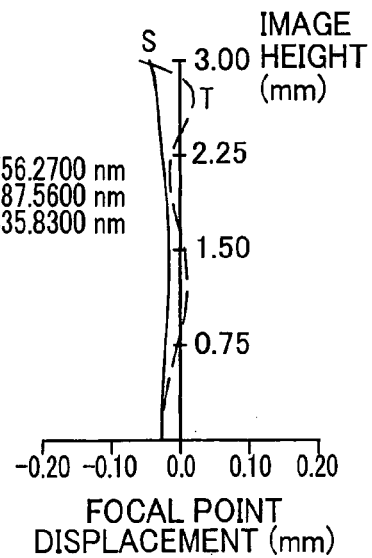
Figure 13F:
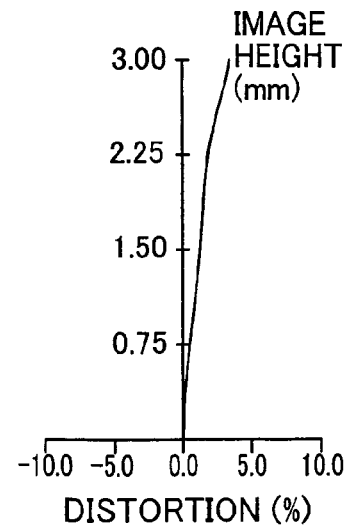
Figure 14A:
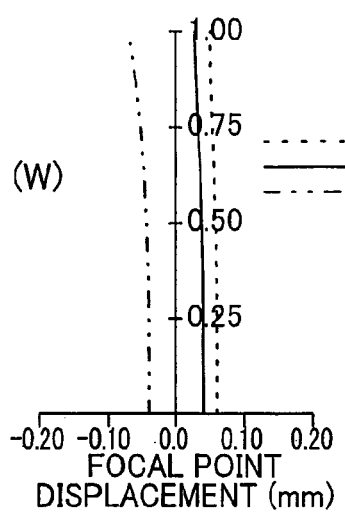
FIGS. 14A through 14I are aberration diagrams regarding spherical aberration, astigmatism, and distortion aberration of the lens groups in the zoom optical system as the fourth embodiment.
Figure 14B:
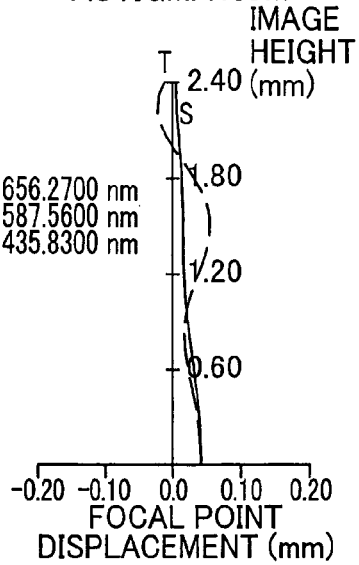
Figure 14C:
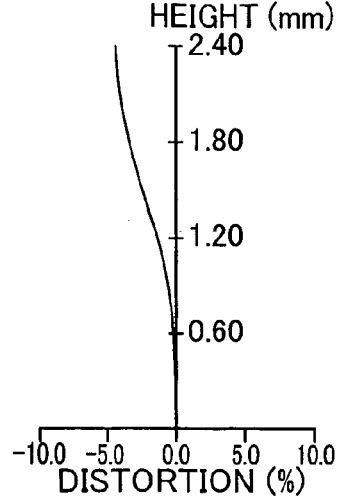
Figure 14D:
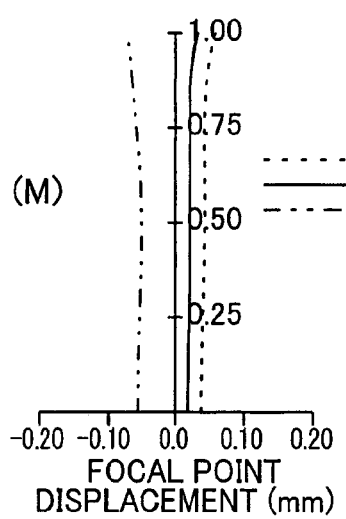
Figure 14E:
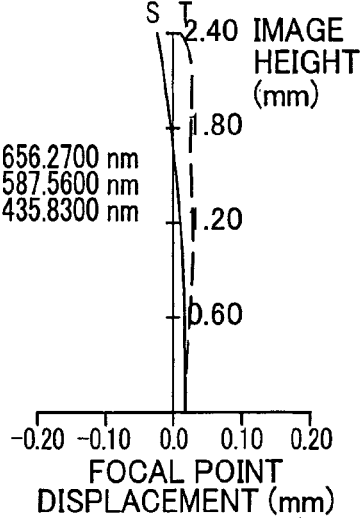
Figure 14F:
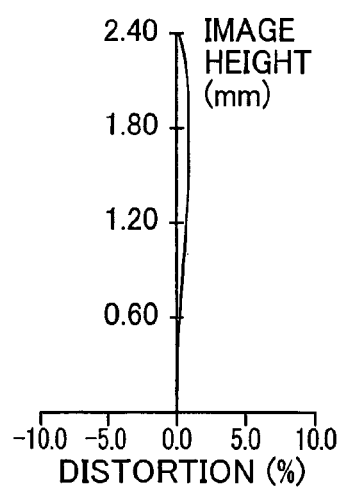
Figure 14G:
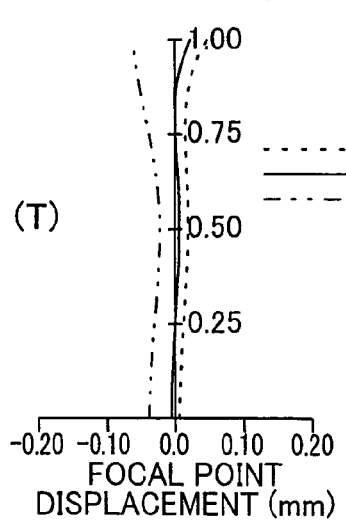
Figure 14H:
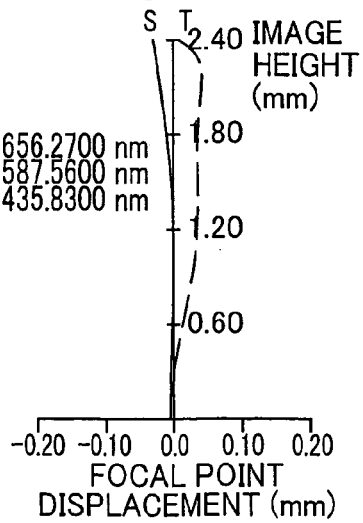
Figure 14I:
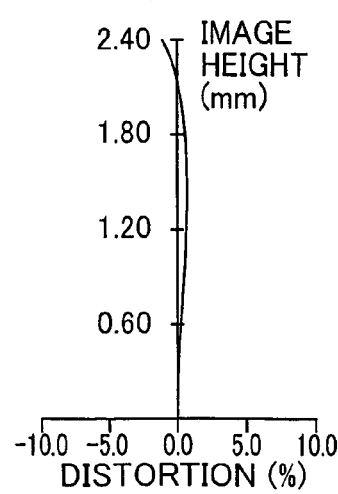
Figure 15A:
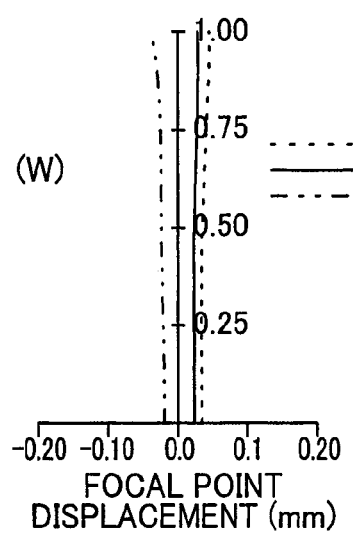
FIGS. 15A through 15F, are aberration diagrams regarding spherical aberration, astigmatism, and distortion aberration of the lens groups in the zoom optical system as the fifth embodiment.
Figure 15B:
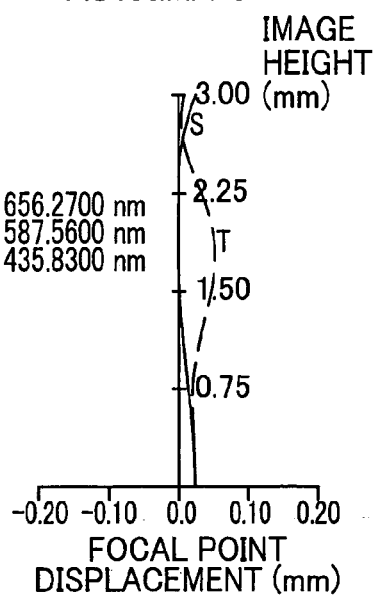
Figure 15C:
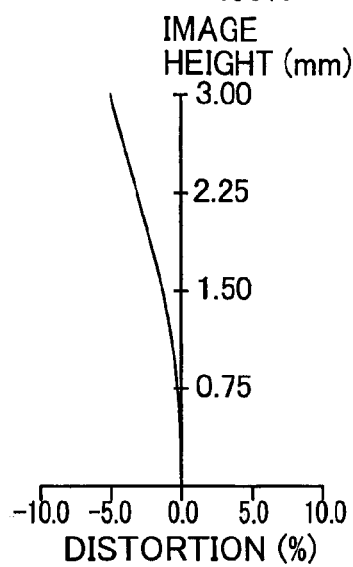
Figure 15D:
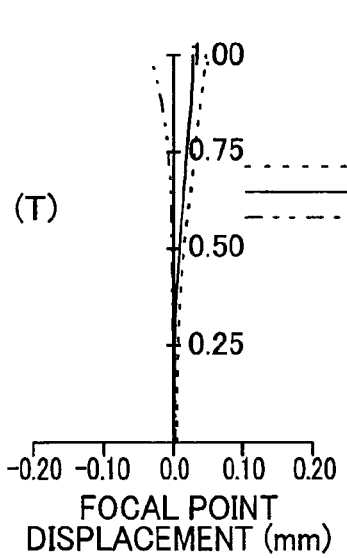
Figure 15E:
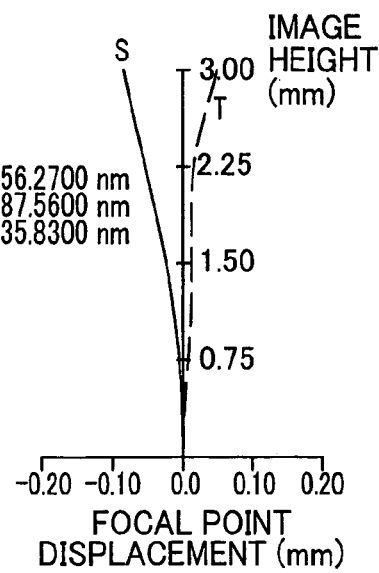
Figure 15F:
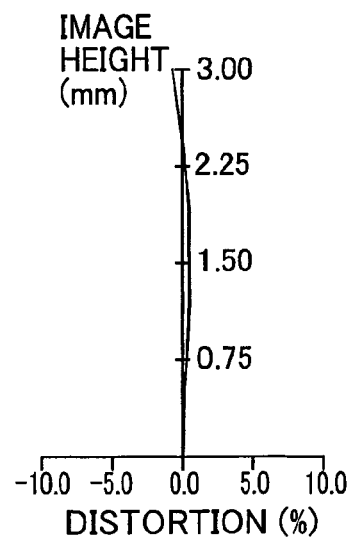
Figure 16A:
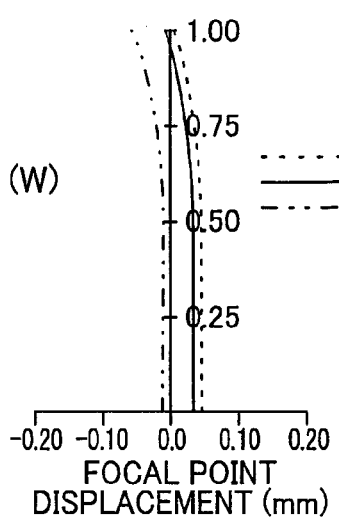
FIGS. 16A through 16I are aberration diagrams regarding spherical aberration, astigmatism, and distortion aberration of the lens groups in the zoom optical system as the sixth embodiment.
Figure 16B:
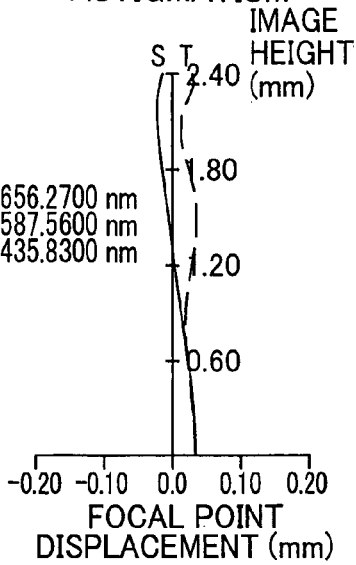
Figure 16C:
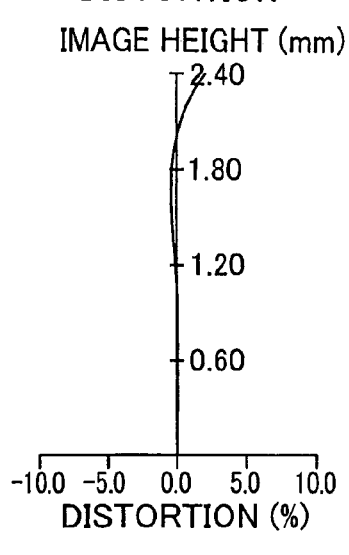
Figure 16D:
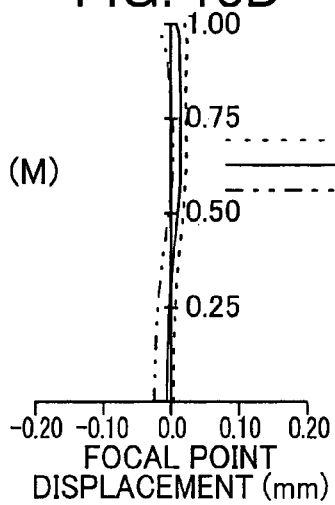
Figure 16E:
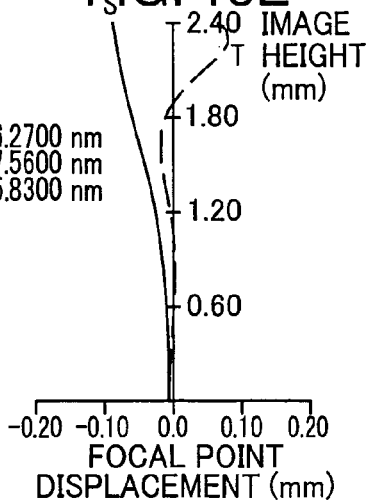
Figure 16F:
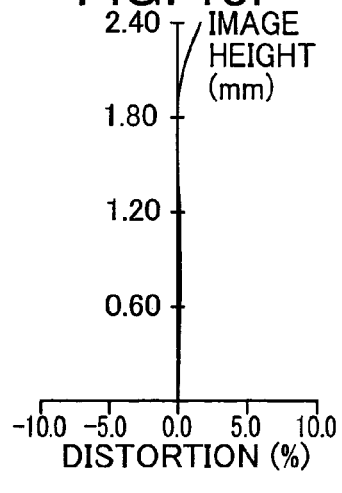
Figure 16G:
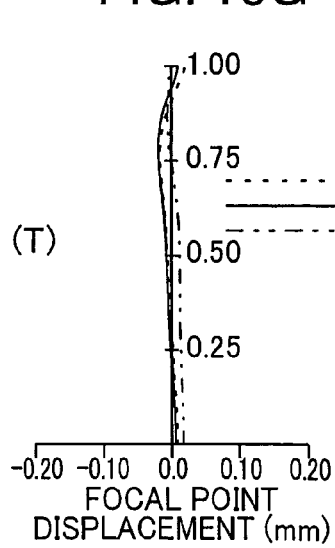
Figure 16H:
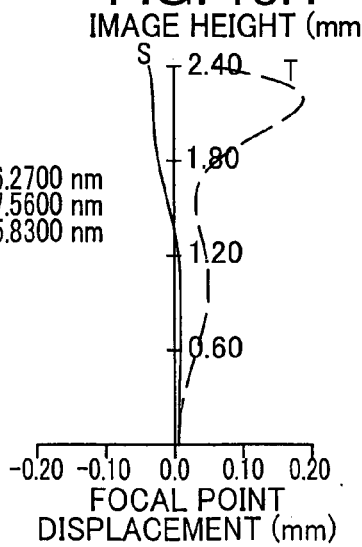
Figure 16I:
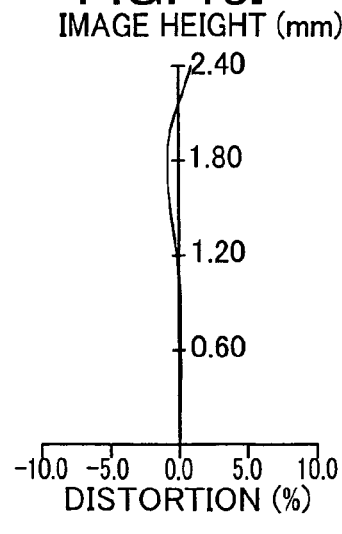
Figure 17A:
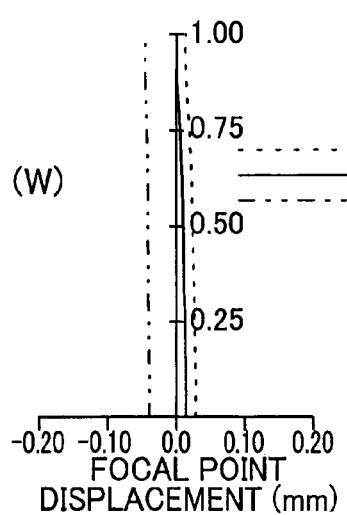
FIGS. 17A through 17I are aberration diagrams regarding spherical aberration, astigmatism, and distortion aberration of the lens groups in the zoom optical system as the seventh embodiment.
Figure 17B:
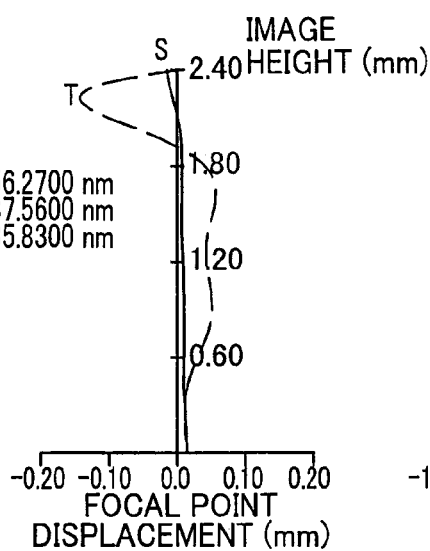
Figure 17C:
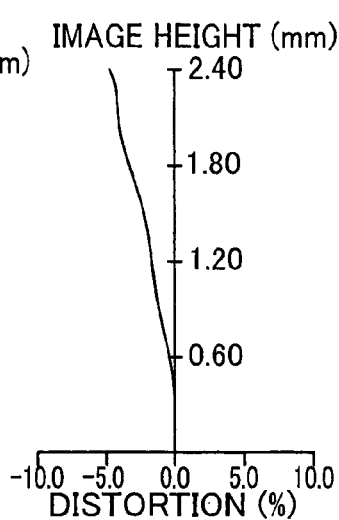
Figure 17D:
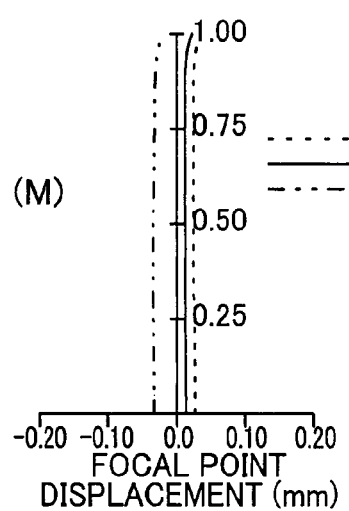
Figure 17E:
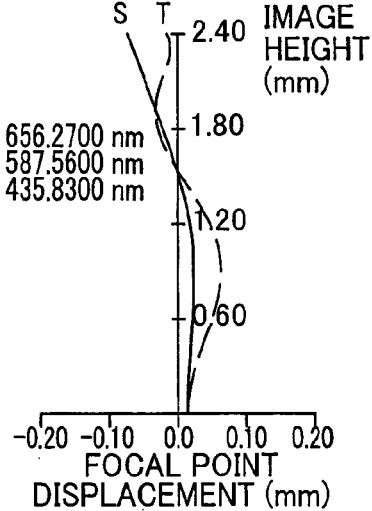
Figure 17F:
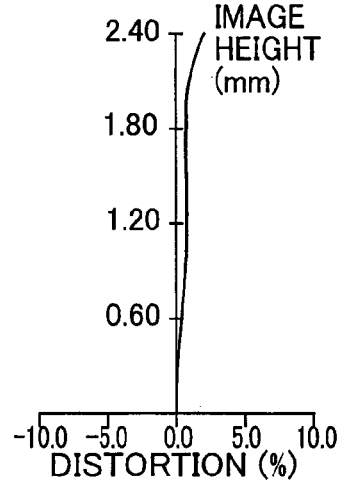
Figure 17G:
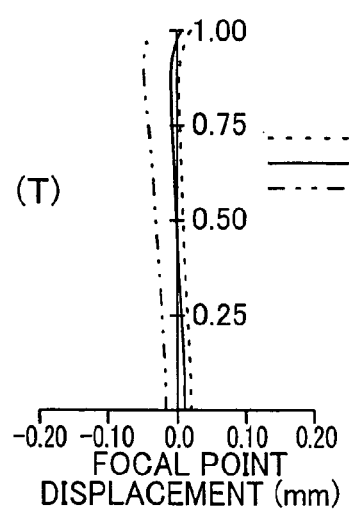
Figure 17H:
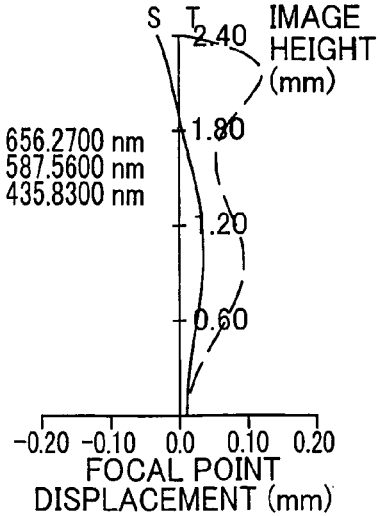
Figure 17I:
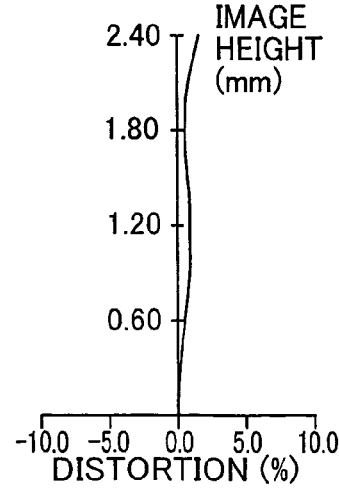
Figure 18A:
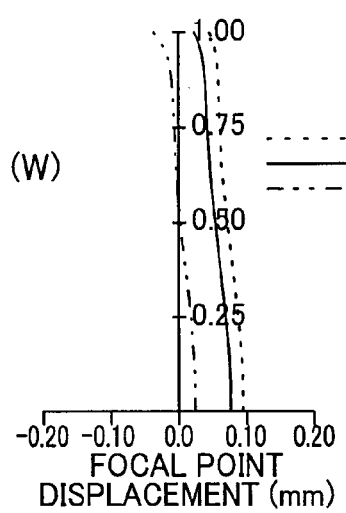
FIGS. 18A through 18I are aberration diagrams regarding spherical aberration, astigmatism, and distortion aberration of the lens groups in the zoom optical system as the eighth embodiment.
Figure 18B:
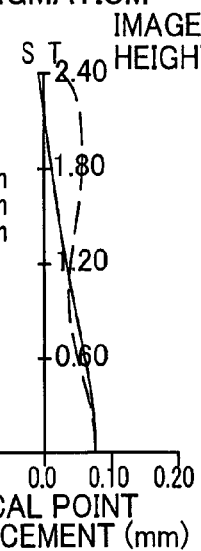
Figure 18C:
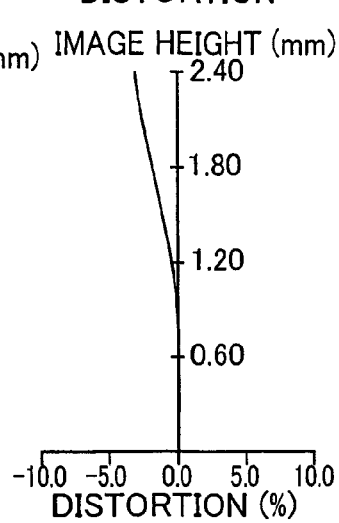
Figure 18D:
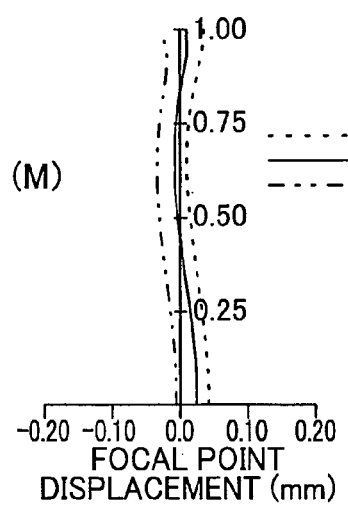
Figure 18E:
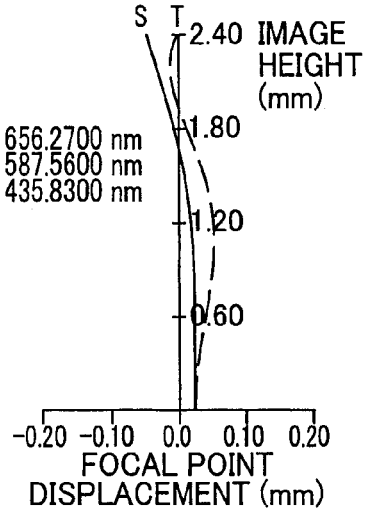
Figure 18F:
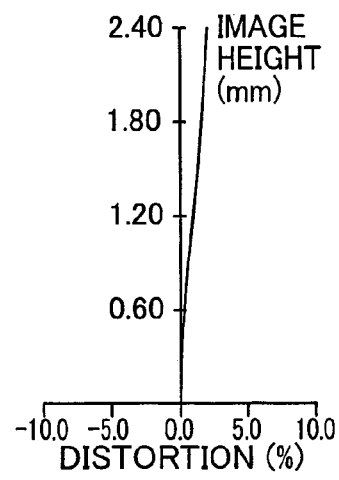
Figure 18G:
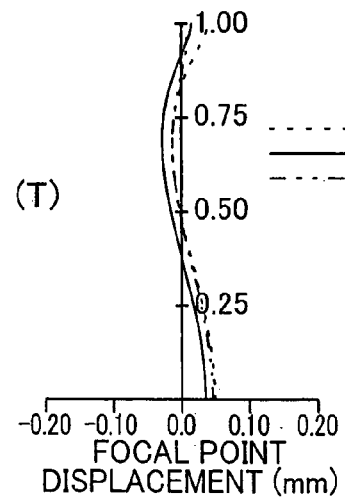
Figure 18H:
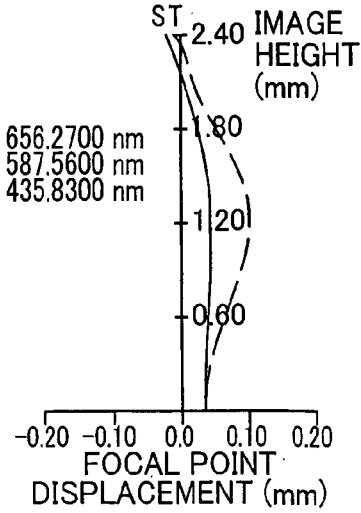
Figure 18I:
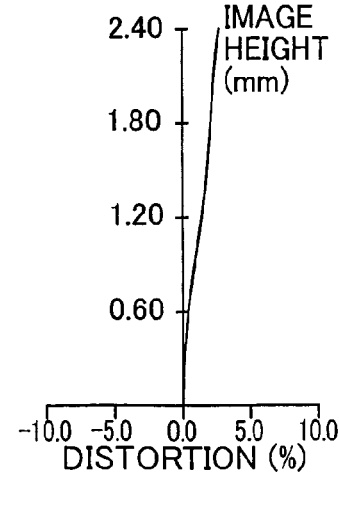

FIGS. 10A through 10E are illustrations each showing how the lens groups are moved in zooming. Similarly to FIGS. 1 through 9, in FIGS. 10A through 10E, the left side corresponds to the object side, and the first lens group (Gr1), the second lens group (Gr2), and the third lens group (Gr3) are arrayed in this order from the object side. Referring to FIGS. 10A through 10E, the symbol W represents a state of the lens group at a wide-angle end where the focal length is the shortest, namely, the angle of view is the largest, and the symbol T represents a state of the lens group at a telephoto end where the focal length is the longest, namely, the angle of view is the smallest. The symbol M represents a state of the lens group where the focal length is in the middle between the state of the wide-angle end (W) and the state of the telephoto end (T). Hereinafter, this state is called as "mid point M". FIG. 10A shows a manner as to how the first through third lens groups are moved in the first, second, fourth, eighth, and ninth embodiments. FIG. 10B shows a manner as to how the first through third lens groups are moved in the third embodiment, FIG. 10C shows a manner as to how the first through third lens groups are moved in the fifth embodiment, FIG. 10D shows a manner as to how the first through third lens groups are moved in the sixth embodiment, and FIG. 10E shows a manner as to how the first through third lens groups are moved in the seventh embodiment.

In the zoom optical system of a three-unit type comprising the first lens group having a negative optical power, the second lens group having a positive optical power, and the third lens group having a positive optical power, as in the embodiments of the present invention, the second lens group (Gr2) is primarily adapted for zooming. Accordingly, the second lens group (Gr2) has a significantly large optical power. In this case, the imaging point by the second lens group (Gr2) has an extreme value at a certain point during zooming. In other words, even if the second lens group (Gr2) is attempted to be moved when the magnification of the second lens group (Gr2) approaches the life-size magnification, there is no or less back focus variation. On the other hand, the first lens group (Gr1) and the third lens group (Gr3) do not significantly contribute to zooming, there is no likelihood that the magnification of the first lens group (Gr1) or the third lens group (Gr3) approaches the life-size magnification during the zooming. In view of this, as shown in FIG. 10A through 10E, throughout the first to ninth embodiments, focusing is conducted by the first lens group (Gr1) or the third lens group (Gr3). In the arrangement wherein the second lens group (Gr2) has a function of zooming, and the first lens group (Gr1) or the third lens group (Gr3) has a function of focusing, there are five ways of movements regarding the first through third lens groups, except for the case that the first lens group (Gr1) and the third lens group (Gr3) are simultaneously moved.

In the lens group arrangement of the first embodiment as shown in FIG. 1, the first lens group (Gr1) makes a u-turn, which means that the first lens group (Gr1) is moved closest to the image sensor (SR) at the mid point (M), whereas the positions of the first lens group (Gr1) at the wide-angle end (W) and the telephoto end (T) are substantially identical to each other, the second lens group (Gr2) is linearly moved toward the object, and the third lens group (Gr3) is fixed (unmoved).

In the following, the lens group arrangements and the movements of the lens groups during zooming in the second through ninth embodiments are described one by one in a similar manner as in the first embodiment. Elements in the second through ninth embodiments which are equivalent to those in the first embodiment are denoted by the same reference numerals.

[Second Embodiment]

Figure 2:
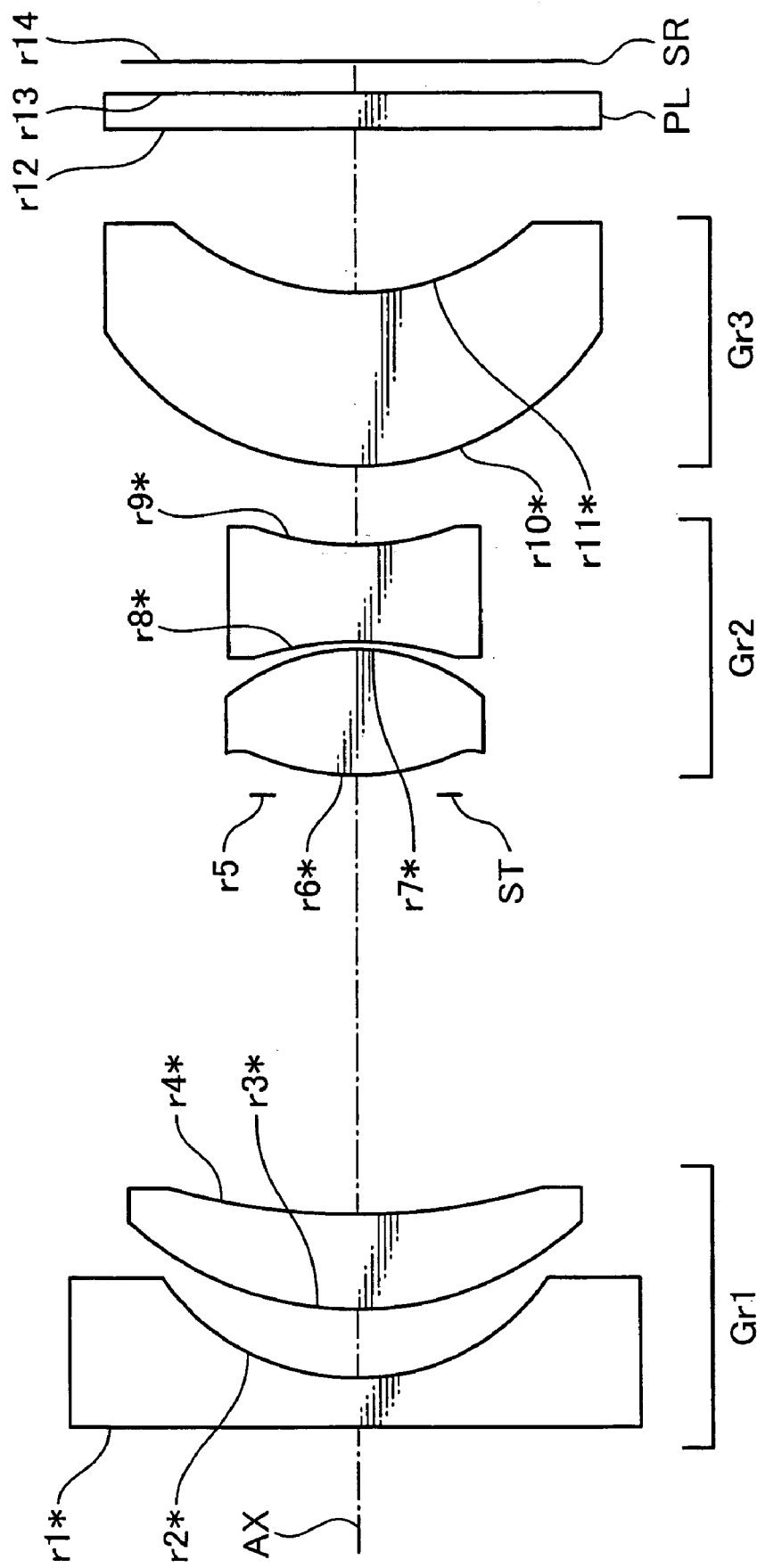
FIG. 2 is a cross-sectional view taken along an optical axis, showing a zoom optical system as a second embodiment of the present invention.

FIG. 2 is a cross-sectional view taken along an optical axis (AX), showing an arrangement of lens groups in a zoom optical system as the second embodiment of the present invention. The zoom optical system as the second embodiment of the present invention is constituted of first through third lens groups (Gr1, Gr2, Gr3) in this order from the object side. Specifically, the first lens group (Gr1) having a negative optical power as a whole is composed of a negative biconcave lens element, and a positive meniscus lens element convex to the object side. The second lens group (Gr2) having a positive optical power as a whole is composed of an aperture stop (ST), a positive biconvex lens element, and a negative biconcave lens element. The third lens group (Gr3) having a positive optical power as a whole is composed of a single meniscus lens element convex to the object side.

In the second embodiment having the above lens group arrangement, in case of zooming from the wide-angle end (W) to the telephoto end (T), as shown in FIG. 10A, similarly to the first embodiment, the first lens group (Gr1) makes a u-turn, the second lens group (Gr2) is linearly moved toward the object, and the third lens group (Gr3) is fixed (unmoved).

[Third Embodiment]

Figure 3:
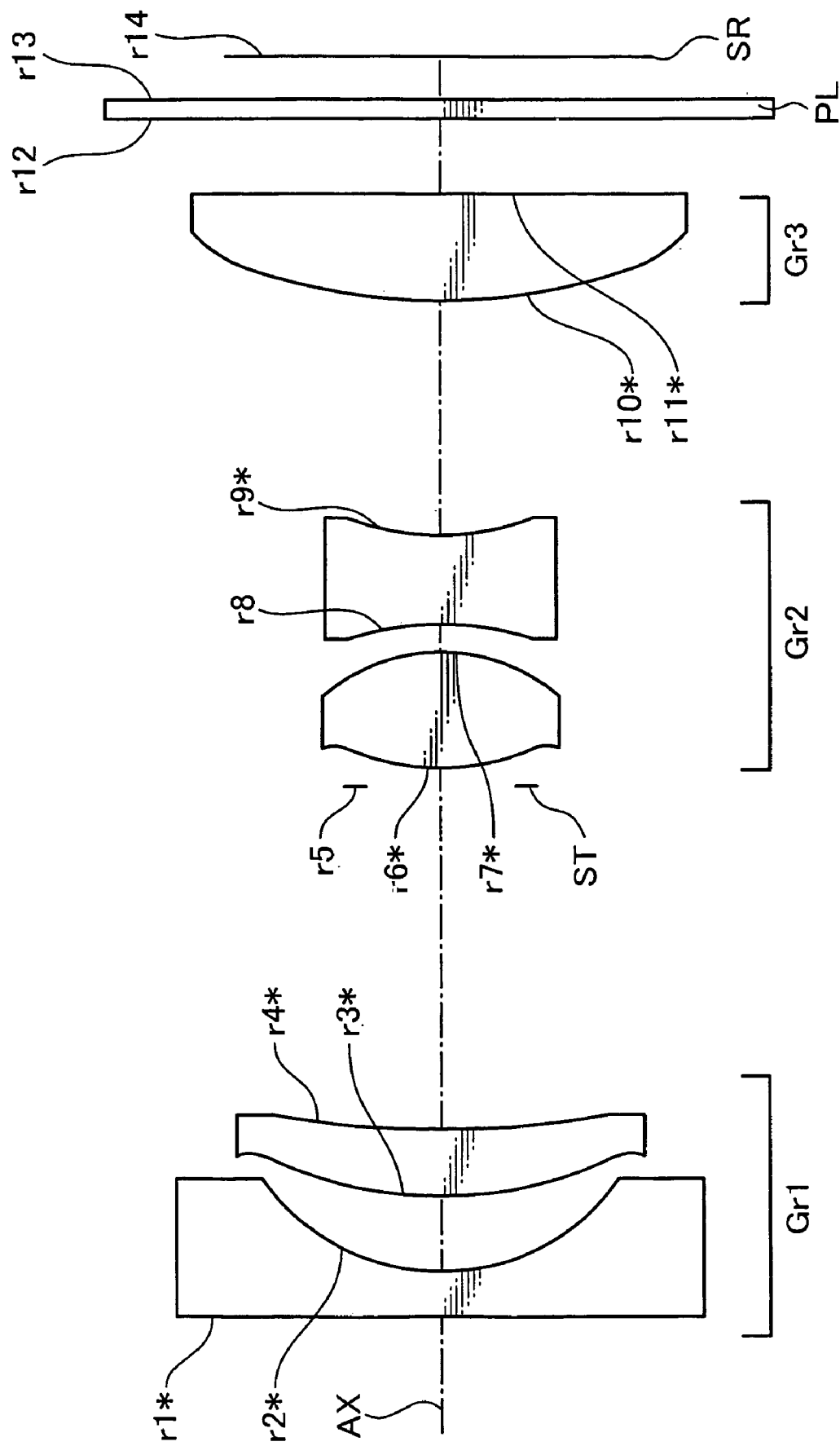
FIG. 3 is a cross-sectional view taken along an optical axis, showing a zoom optical system as a third embodiment of the present invention.

FIG. 3 is a cross-sectional view taken along an optical axis (AX), showing an arrangement of lens groups in a zoom optical system as the third embodiment of the present invention. The third embodiment is different from the first and the second embodiments in that the optical system is of a bi-focal type, wherein the focal point is switched over between the wide-angle end (W) and the telephoto end (T). The zoom optical system as the third embodiment as shown in FIG. 3 is constituted of first through third lens groups (Gr1, Gr2, Gr3) in this order from the object side. Specifically, the first lens group (Gr1) having a negative optical power as a whole is composed of a negative meniscus lens element convex to the object side, and a positive meniscus lens element convex to the object side. The second lens group (Gr2) having a positive optical power as a whole is composed of an aperture stop (ST), a positive biconvex lens element, and a negative biconcave lens element. The third lens group (Gr3) having a positive optical power as a whole is composed of a single meniscus lens element convex to the object side.

In the third embodiment having the above lens group arrangement, in case of zooming from the wide-angle end (W) to the telephoto end (T), as shown in FIG. 10B, the second lens group (Gr2) is linearly moved toward the object, whereas the first lens group (Gr1), and the third lens group (Gr3) are fixed (unmoved).

[Fourth Embodiment]

Figure 4:
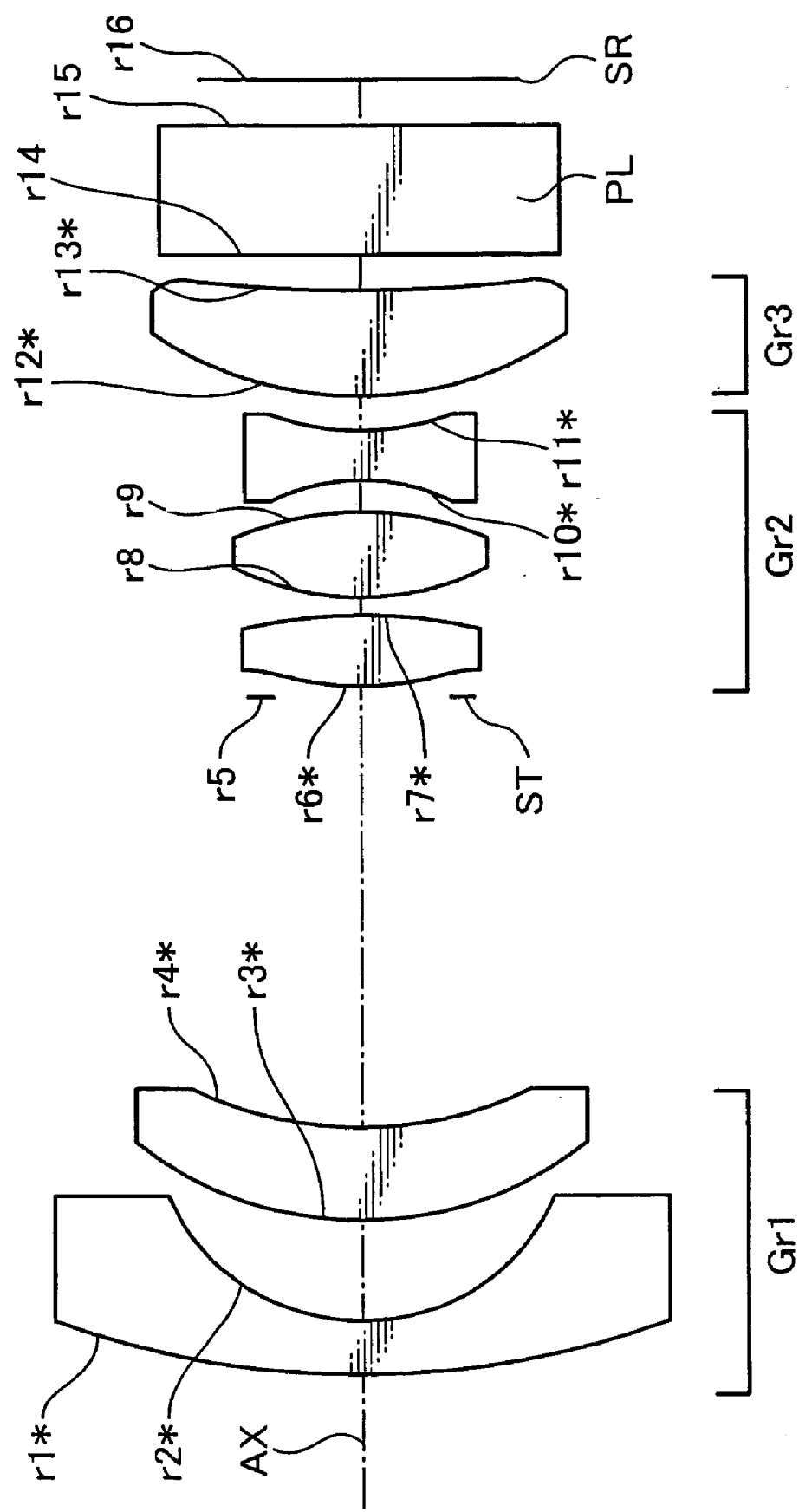
FIG. 4 is a cross-sectional view taken along an optical axis, showing a zoom optical system as a fourth embodiment of the present invention.

FIG. 4 is a cross-sectional view taken along an optical axis (AX), showing an arrangement of lens groups in a zoom optical system as the fourth embodiment of the present invention. The zoom optical system as the fourth embodiment is constituted of first through third lens groups (Gr1, Gr2, Gr3) in this order from the object side. Specifically, the first lens group (Gr1) having a negative optical power as a whole is composed of a negative meniscus lens element convex to the object side, and a positive meniscus lens element convex to the object side. The second lens group (Gr2) having a positive optical power as a whole is composed of an aperture stop (ST), a positive biconvex lens element, another positive biconvex lens element, and a negative biconcave lens element. The third lens group (Gr3) having a positive optical power as a whole is composed of a single positive biconvex lens element.

In the fourth embodiment having the above lens group arrangement, in case of zooming from the wide-angle end (W) to the telephoto end (T), as shown in FIG. 10A, similarly to the first and the second embodiments, the first lens group (Gr1) makes a u-turn, the second lens group (Gr2) is linearly moved toward the object, and the third lens group (Gr3) is fixed (unmoved).

[Fifth Embodiment]

Figure 5:
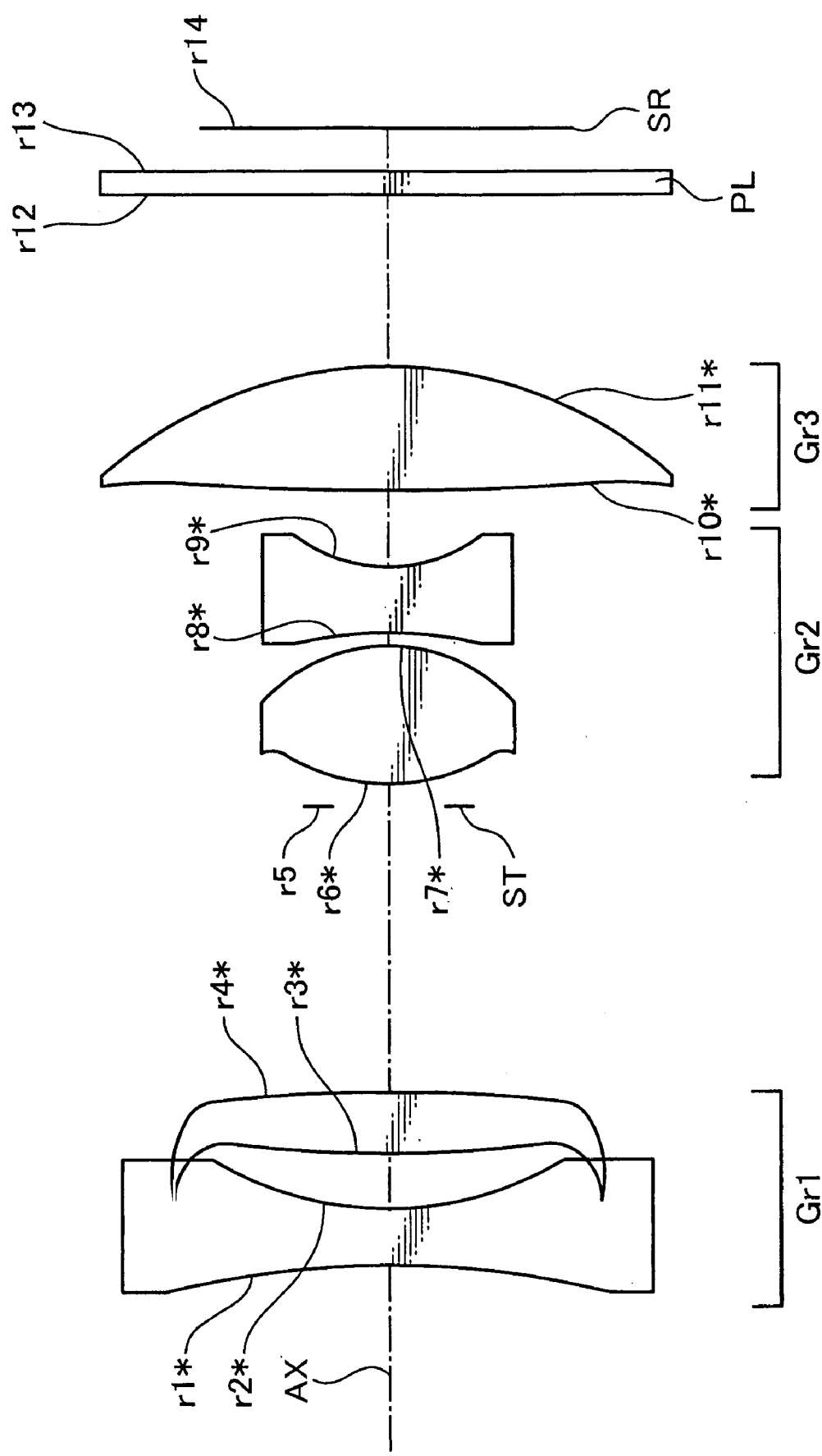
FIG. 5 is a cross-sectional view taken along an optical axis, showing a zoom optical system as a fifth embodiment of the present invention.

FIG. 5 is a cross-sectional view taken along an optical axis (AX), showing an arrangement of lens groups in a zoom optical system as the fifth embodiment of the present invention. The optical system as the fifth embodiment is of a bi-focal type, wherein the focal point is switched over between the wide-angle end (W) and the telephoto end (T). The zoom optical system as the fifth embodiment is constituted of first through third lens groups (Gr1, Gr2, Gr3) in this order from the object side. Specifically, the first lens group (Gr1) having a negative optical power as a whole is composed of a negative biconcave lens element, and a positive biconvex lens element. The second lens group (Gr2) having a positive optical power as a whole is composed of an aperture stop (ST), a positive biconvex lens element, and a negative biconcave lens element. The third lens group (Gr3) having a positive optical power as a whole is composed of a single positive biconvex lens element.

In the fifth embodiment having the above lens group arrangement, in case of zooming from the wide-angle end (W) to the telephoto end (T), as shown in FIG. 10C, the first lens group (Gr1) is unmoved, the second lens group (Gr2) is linearly moved toward the object, and the third lens group (Gr3) is linearly moved toward the image sensor (SR) away from the object.

[Sixth Embodiment]

Figure 6:
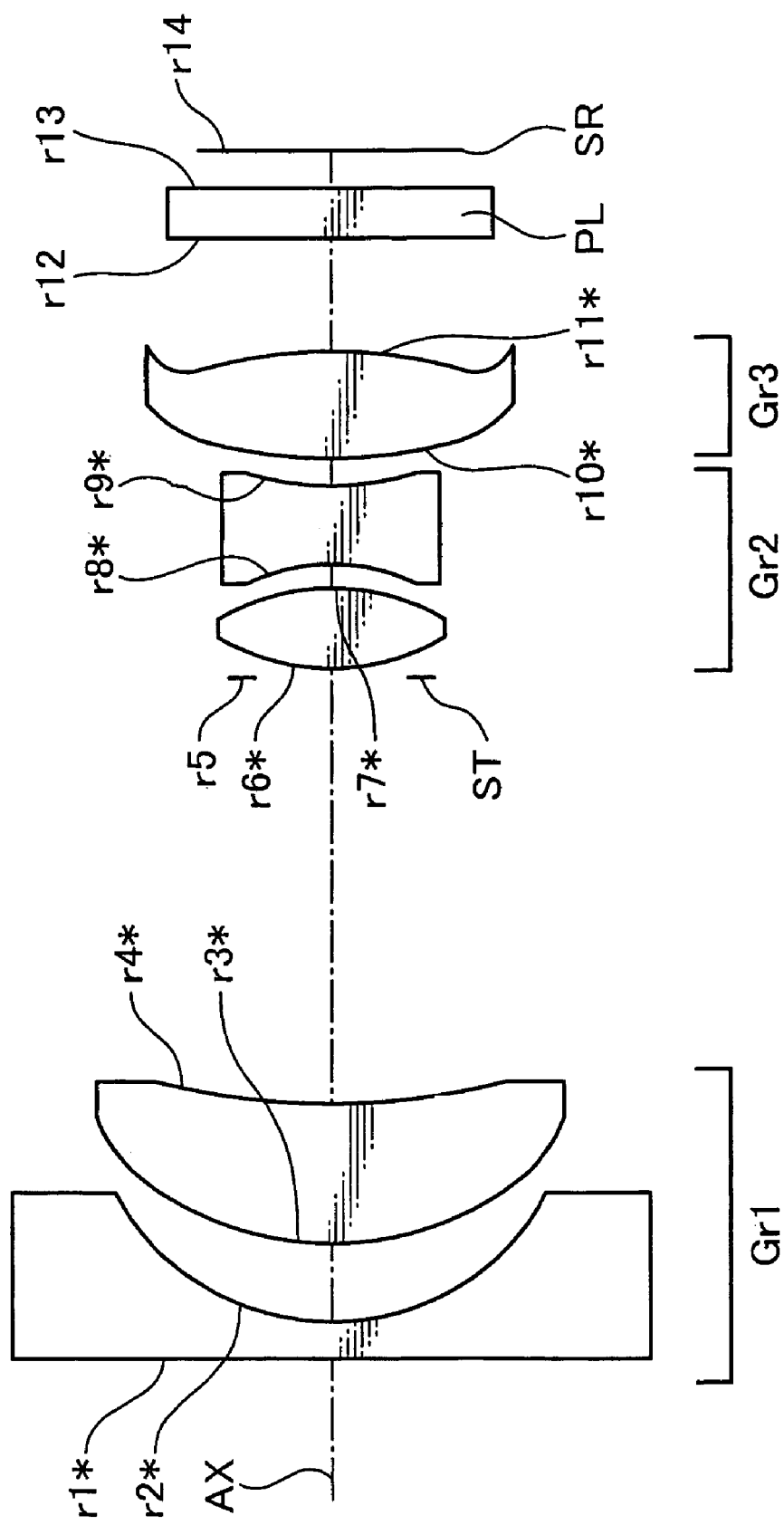
FIG. 6 is a cross-sectional view taken along an optical axis, showing a zoom optical system as a sixth embodiment of the present invention.

FIG. 6 is a cross-sectional view taken along an optical axis (AX), showing an arrangement of lens groups in a zoom optical system as the sixth embodiment of the present invention. The zoom optical system as the sixth embodiment is constituted of first through third lens groups (Gr1, Gr2, Gr3) in this order from the object side. Specifically, the first lens group (Gr1) having a negative optical power as a whole is composed of a negative biconcave lens element, and a positive meniscus lens element convex to the object side. The second lens group (Gr2) having a positive optical power as a whole is composed of an aperture stop (ST), a positive biconvex lens element, and a negative biconcave lens element. The third lens group (Gr3) having a positive optical power as a whole is composed of a single positive biconvex lens element.

In the sixth embodiment having the above lens group arrangement, in case of zooming from the wide-angle end (W) to the telephoto end (T), as shown in FIG. 10D, the first lens group (Gr1) is unmoved, the second lens group (Gr2) is linearly moved toward the object, and the third lens group (Gr3) makes a u-turn.

[Seventh Embodiment]

Figure 7:
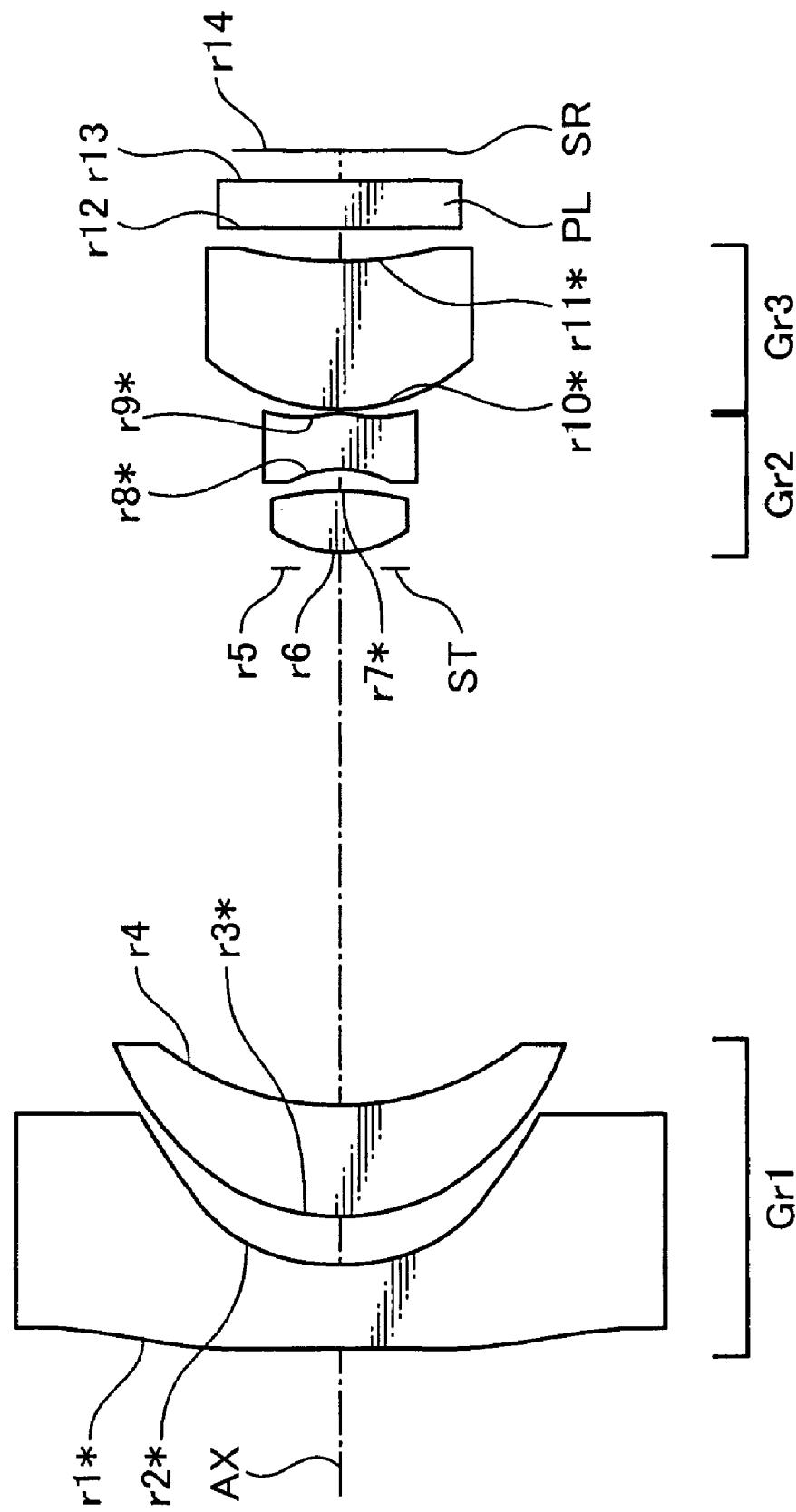
FIG. 7 is a cross-sectional view taken along an optical axis, showing a zoom optical system as a seventh embodiment of the present invention

FIG. 7 is a cross-sectional view taken along an optical axis (AX), showing an arrangement of lens groups in a zoom optical system as the seventh embodiment of the present invention. The zoom optical system as the seventh embodiment is constituted of first through third lens groups (Gr1, Gr2, Gr3) in this order from the object side. Specifically, the first lens group (Gr1) having a negative optical power as a whole is composed of a negative biconcave lens element, and a positive meniscus lens element convex to the object side. The second lens group (Gr2) having a positive optical power as a whole is composed of an aperture stop (ST), a positive biconvex lens element, and a negative meniscus lens element convex to the image sensor (SR) side. The third lens group (Gr3) having a positive optical power as a whole is composed of a single positive meniscus lens element convex to the object side.

In the seventh embodiment having the above lens group arrangement, in case of zooming from the wide-angle end (W) to the telephoto end (T), as shown in FIG. 10E, the first lens group (Gr1) is linearly moved away from the object, the second lens group (Gr2) is linearly moved toward the object, and the third lens group (Gr3) is unmoved.

[Eighth Embodiment]

Figure 8:
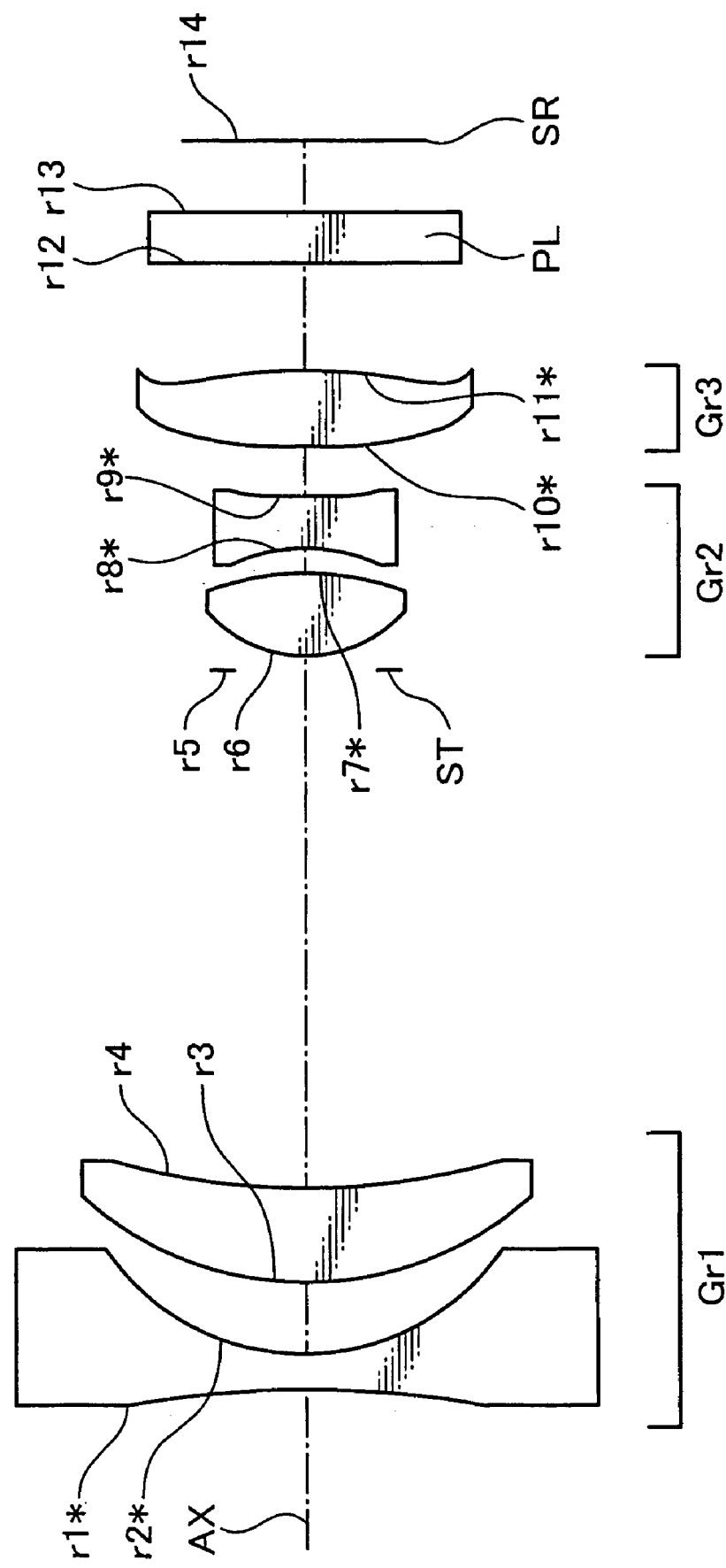
FIG. 8 is a cross-sectional view taken along an optical axis, showing a zoom optical system as an eighth embodiment of the present invention.

FIG. 8 is a cross-sectional view taken along an optical axis (AX), showing an arrangement of lens groups in a zoom optical system as the eighth embodiment of the present invention. The zoom optical system as the eighth embodiment is constituted of first through third lens groups (Gr1, Gr2, Gr3) in this order from the object side. Specifically, the first lens group (Gr1) having a negative optical power as a whole is composed of a negative biconcave lens element, and a positive meniscus lens element convex to the object side. The second lens group (Gr2) having a positive optical power as a whole is composed of an aperture stop (ST), a positive biconvex lens element, and a negative biconcave lens element. The third lens group (Gr3) having a positive optical power as a whole is composed of a single positive biconvex lens element.

In the eighth embodiment having the above lens group arrangement, in case of zooming from the wide-angle end (W) to the telephoto end (T), as shown in FIG. 10A, similarly to the first, the second, and the fourth embodiments, the first lens group (Gr1) makes a u-turn, the second lens group (Gr2) is linearly moved toward the object, and the third lens group (Gr3) is fixed (unmoved).

[Ninth Embodiment]

FIG. 9 is a cross-sectional view taken along an optical axis (AX), showing an arrangement of lens groups in a zoom optical system as the ninth embodiment of the present invention. The zoom optical system as the ninth embodiment is constituted of first through third lens groups (Gr1, Gr2, Gr3) in this order from the object side. Specifically, the first lens group (Gr1) having a negative optical power as a whole is composed of a negative biconcave lens element, and a positive meniscus lens element convex to the object side. The second lens group (Gr2) having a positive optical power as a whole is composed of a positive biconvex lens element, a negative biconcave lens element, and an aperture stop (ST). The third lens group (Gr3) having a positive optical power as a whole is composed of a single positive biconvex lens element. Further, whereas the aperture stop (ST) for adjusting the light amount is included in the second lens group (Gr2) on the side of the first lens group (Gr1) in the first through the eighth embodiments, the aperture stop (ST) is included in the second lens group (Gr2) on the side of the third lens group (Gr3) in the ninth embodiment.

In the ninth embodiment having the above lens group arrangement, in case of zooming from the wide-angle end (W) to the telephoto end (T), as shown in FIG. 10A, similarly to the first, the second, the fourth, and the eighth embodiments, the first lens group (Gr1) makes a u-turn, the second lens group (Gr2) is linearly moved toward the object, and the third lens group (Gr3) is fixed (unmoved).

In the following, requirements, or conditional formulae regarding optical characteristics of the lens groups constituting the zoom optical system embodying the present invention are described, along with grounds for determining the requirements or grounds for determining the numerical ranges.

As described in the respective embodiments, it is desirable that the following conditional formula (1) be satisfied regarding the zoom optical system constituted of the first lens group (Gr1) having a negative optical power as a whole, the second lens group (Gr2) having a positive optical power as a whole, and the third lens group (Gr3) having a positive optical power as a whole in this order from the object side, wherein the first lest unit (Gr1) is composed of two or more lens elements including at least one negative lens element and at least one positive lens element, the second lens group (Gr2) is composed of two or more lens elements including at least one positive lens element and at least one negative lens element, and all the lens elements in the first lens group (Gr1) are made of a plastic material.

$$10 < |v_{1n} - v_{1p}| < 35 \quad (1)$$

where $v_{1n}$ represents the Abbe number of a plastic lens element having a strongest negative optical power in the first lens group (Gr1), and $v_{1p}$ represents the Abbe number of a plastic lens element having a strongest positive optical power in the first lens group (Gr1). If the upper limit of the conditional formula (1) is transgressed, there is no plastic material of multi-purpose use and having properties suitable as an optical material. If the lower limit of the conditional formula (1) is transgressed, an effective lateral chromatic aberration correction in the first lens group (Gr1) is not obtainable.

Further, it is desirable that the Abbe number of the first lens group (Gr1) satisfy the following conditional formula (2) in the formula (1).

$$23 < |v_{1n} - v_{1p}| < 30 \quad (2)$$

If the upper limit of the conditional formula (2) is transgressed, what is available as a plastic material is the one having problems relating to properties such as hygroscopic property. If the lower limit of the conditional formula (2) is transgressed, lateral chromatic aberration correction in the first lens group (Gr1) is insufficient.

Further, it is desirable that all the lens groups, namely, the first, the second, and the third lens groups (Gr1, Gr2, Gr3) of the zoom optical system satisfy the following conditional formula (3).

$$0.15 < h_1/T_w \quad (3)$$

where h1 represents an effective optical path radius of a lens surface closest to the object at the wide-angle end (W), and TW represents an optical axis distance from the apex of the lens surface closest to the object to the light receiving plane of the image sensor (SR) at the wide-angle end (W) when the distance to the object is infinite. If the lower limit of the conditional formula (3) is transgressed, it is difficult to widen the width of a light flux passing the object-side lens element while keeping miniaturization of the optical system, because such an arrangement makes it difficult to minimize the F-number, namely, to admit more light at the wide-angle end (W).

Further, it is desirable that the first lens group (Gr1) in the zoom optical system satisfy the following conditional formula (4).

$$\left| \sum_{j=1}^{n} (\phi_{1j}/v_{1j}) \right| < 0.003 \quad (4)$$

where $\phi_{1j}$ represents the optical power of the j-th lens element from the object side in the first lens group (Gr1), $v_{1j}$ represents the Abbe number of the j-th lens element from the object side in the first lens group (Gr1), and n represents the number of lens elements constituting the first lens group (Gr1). If the upper limit of the conditional formula (4) is transgressed, contrast is lowered due to insufficient lateral chromatic aberration correction, which may likely to lower performance of the optical system.

Further, in the zoom optical system, it is desirable that two or more lens elements in the second lens group (Gr2) be composed of a plastic material. Since the second lens group (Gr2) has the longest moving distance among all the lens groups during zooming, using two or more plastic lens elements in the second lens group (Gr2) makes it possible to produce a lightweight optical system, as compared with an optical system with a glass lens element, thereby reducing the load to the lens driver.

Further, it is desirable that the second lens group (Gr2) in the zoom optical system satisfy the following conditional formula (5).

$$\left| \sum_{j=1}^{m} (\phi_{2j}/v_{2j}) \right| < 0.01 \quad (5)$$

where $\theta_{2j}$ represents the optical power of the j-th lens element from the object side in the second lens group (Gr2), $v_{2j}$ represents the Abbe number of the j-th lens element from the object side in the second lens group (Gr2), and m represents the number of lens elements constituting the second lens group (Gr2). If the upper limit of the conditional formula (5) is transgressed, contrast is lowered due to insufficient axial chromatic aberration correction, which may likely to lower performance of the optical system.

In the respective embodiments, it is desirable that an aperture stop (ST) be arranged between the first lens group (Gr1) and the second lens group (Gr2), and that the aperture stop (ST) be moved toward the object along with the second lens group (Gr2) in zooming from the wide-angle end (W) to the telephoto end (T). It is possible to arrange the aperture stop (ST) in the second lens group (Gr2) or between the second lens group (Gr2) and the third lens group (Gr3). However, such an arrangement may invoke drawbacks such as loss of telecentricity regarding the incident angle of an off-axis ray onto the light receiving plane of the image sensor (SR), lowering of the light amount in the periphery of the display screen, and increase of an outer diameter of the first and second lens groups (Gr1, Gr2). As mentioned above, moving the aperture stop (ST) with the second lens group (Gr2) toward the object in zooming makes it possible to suppress the drawbacks, as well as suppressing an apparent increase of the outer diameter of the second lens group (Gr2).

In the respective embodiments, it is desirable that the respective composite focal lengths of the second lens group (Gr2) and all the lens groups constituted of the first through third lens groups satisfy at least one of the conditional formulae (6) and (7).

$$1 < f_2/f_W < 2.5 \quad (6)$$

$$0.5 < f_2/f_T < 0.9 \quad (7)$$

where $f_2$ represents the composite focal length of the second lens group (Gr2), $f_W$ represents the composite focal length of all the lens groups, namely, the first, the second, and the third lens groups (Gr1, Gr2, Gr3) at the wide-angle end (W), and $f_T$ represents the composite focal length of all the lens groups, namely, the first, the second, and the third lens groups (Gr1, Gr2, Gr3) at the telephoto end (T). If the respective upper limits of the conditional formulae (6) and (7) are transgressed, the optical power of the second lens group may be weakened, which makes it difficult to obtain a zoom ratio such as two to three times. Further, if the respective lower limits of the conditional formulae (6) and (7) are transgressed, error sensitivity of the second lens group may be increased, which makes it difficult to fabricate the optical system.

Further, it is desirable that the respective composite focal lengths of the second lens group (Gr2) and all the lens groups constituted of the first through third lens groups satisfy the following conditional formula (8).

$$1.1 < f_2/f_W < 2 \qquad (8)$$

If the upper limit of the conditional formula (8) is transgressed, the moving distance of the second lens group (Gr2) during zooming may be unduly increased due to weakened optical power of the second lens group (Gr2), and degradation of off-axial performance at the telephoto end (T) may be remarkable. On the other hand, if the lower limit of the conditional formula (8) is transgressed, error sensitivity of the second lens group (Gr2) may be increased, and adjustment regarding the lens elements in the second lens group (Gr2) or the lens elements in the first through third lens group may be required, which may result in production cost rise.

In the respective embodiments, it is desirable that the second lens group (Gr2) satisfy the following conditional formula (9) if all the lens elements in the first, the second, and the third lens groups (Gr1, Gr2, Gr3) of the zoom optical system are made of a plastic material.

$$23 < |v_{2n} - v_{2p}| < 30 \qquad (9)$$

where $v_{2n}$ represents the Abbe number of a plastic lens element having a strongest negative optical power in the second lens group (Gr2), and $v_{2p}$ represents the Abbe number of a plastic lens element having a strongest positive optical power in the second lens group (Gr2). If the upper limit of the conditional formula (9) is transgressed, what is available as a plastic material is the one having problems relating to properties such as hygroscopic property. If the lower limit of the conditional formula (9) is transgressed, axial chromatic aberration correction in the second lens group (Gr2) is insufficient.

In the respective embodiments, it is preferable that focusing is performed by moving the first lens group (Gr1) or the third lens group (Gr3) in an imaging lens unit constructed such that focusing is performed by moving the lens groups. This is because effective focusing by the second lens group (Gr2) is not expected due to a small back focus variation in the vicinity where the magnification of the second lens group (Gr2) approaches the life-size magnification. Further, it is desirable to perform focusing by the first lens group (Gr1). This is because the optical power of the first lens group (Gr1) is stronger than that of the third lens group (Gr3), and the moving distance for focusing is lessened by using the first lens group (Gr1). However, in case of using the optical system in which the first lens group (Gr1) is unmoved, it is possible to perform focusing by the third lens group (Gr3) by intentionally increasing the optical power of the third lens group (Gr3).

In the case where the second lens group (Gr2) is composed of a single positive lens element and a single negative lens element, it is desirable that the ratio of the focal length of the negative lens element to the positive lens element in the second lens group satisfy the following conditional formula (10).

$$0.5 < |f_{2n}/f_{2p}| < 1.5 \qquad (10)$$

where $f_{2p}$ represents the focal length of the positive lens element in the second lens group (Gr2), and $f_{2n}$ represents the focal length of the negative lens element in the second lens group (Gr2). If the upper limit of the conditional formula (10) is transgressed, back focus variation with environmental temperature change is increased, and the moving distance of the lens group to be driven for focusing is unduly increased. This may increase the total length of the optical system. Further, axial chromatic aberration correction may be insufficient, which may lower contrast. On the other hand, if the lower limit of the conditional formula (10) is transgressed, the optical power of the second lens group (Gr2) may be weakened, which may make it difficult to obtain a zoom ratio such as two to three times.

Further, it is desirable that the focal length of the second lens group (Gr2) satisfy the following conditional formula (11).

$$0.8 < |f_{2n}/f_{2p}| < 1.3 \qquad (11)$$

If the upper limit of the conditional formula (11) is transgressed, error sensitivity balance between the two lens elements may be lowered, and error sensitivity of the second lens group (Gr2) as a whole may be increased. In such a case, adjustment within the second lens group (Gr2) is not enough for correcting the error sensitivity balance, and adjustment of the distance between the lens elements in the first, the second, and the third lens groups may be required. If the lower limit of the conditional formula (11) is transgressed, the optical power of the second lens group (Gr2) may be weakened, and the moving distance of the second lens group (Gr2) in zooming may be unduly increased.

In the case where the first lens group (Gr1) is composed of a single positive lens element and a single negative lens element, it is desirable that the focal length of the first lens group (Gr1) satisfy the following conditional formula (12).

$$0.1 < |f_{1n}/f_{1p}| < 0.7 \qquad (12)$$

where $f_{1p}$ represents the focal length of the positive lens element in the first lens group (Gr1), and $f_{1n}$ represents the focal length of the negative lens element in the first lens group (Gr1). If the upper limit of the conditional formula (12) is transgressed, correction on astigmatism and distortion aberration particularly at the wide-angle end (W) is insufficient. On the other hand, if the lower limit of the conditional formula (12) is transgressed, the optical power of the respective lens elements constituting the first lens group (Gr1) may be unduly increased, which may make it difficult to fabricate the optical system. Further, lateral chromatic aberration may unduly affect the characteristics of the optical system, and correction of such characteristics may be difficult.

It is desirable that the focal length of the first lens group (Gr1) satisfy the following conditional formula (13).

$$0.2 < |f_{1n}/f_{1p}| < 0.5 \qquad (13)$$

If the upper limit of the conditional formula (13) is transgressed, the optical power of the first lens group (Gr1) may be weakened, and the moving distance of the first lens group (Gr1) for focusing by driving of the first lens group (Gr1) may be unduly increased. On the other hand, if the lower limit of the conditional formula (13) is transgressed, error sensitivity of the first lens group (Gr1) as a whole may be increased, and adjustment of the distance between the lens elements in the first lens group (Gr1) may be required.

Further, it is desirable that the respective composite focal lengths of the first lens group (Gr1) and all the lens groups constituted of the first through third lens groups satisfy at least one of the following conditional formulae (14) and (15).

$$1 < |f_1/f_W| < 5 \qquad (14)$$

$$0.5 < |f_1/f_T| < 1.5 \qquad (15)$$

where $f_1$ represents the composite focal length of the first lens group (Gr1), $f_W$ represents the composite focal length of all the lens groups constituted of the first, the second, and the third lens groups (Gr1, Gr2, Gr3) at the wide-angle end (W), and $f_T$ represents the composite focal length of all the lens groups constituted of the first, the second, and the third lens groups (Gr1, Gr2, Gr3) at the telephoto end (T). If the respective upper limits on the ratio of the focal length in the conditional formulae (14) and (15) are transgressed, correction on astigmatism and distortion aberration particularly at the wide-angle end (W) may be insufficient. On the other hand, if the respective lower limits on the ratio of the focal length in the conditional formulae (14) and (15) are transgressed, the optical power of the respective lens elements constituting the first lens group (Gr1) may be unduly increased, which may make it difficult to fabricate the optical system. Further, lateral chromatic aberration may unduly affect the characteristics of the optical system, and correction of such characteristics may be difficult.

It is desirable that the respective focal lengths of the first lens group (Gr1) and all the lens groups constituted of the first through third lens groups satisfy the following conditional formula (16).

$$1.5 < |f_1/f_W| < 3.5 \qquad (16)$$

If the upper limit of the conditional formula (16) is transgressed, the optical power of the first lens group (Gr1) may be weakened, and the moving distance of the first lens group (Gr1) for focusing by driving of the first lens group (Gr1) may be unduly increased. On the other hand, if the lower limit of the conditional formula (16) is transgressed, error sensitivity of the first lens group (Gr1) as a whole may be increased, and adjustment of the distance between the lens elements in the first lens group (Gr1) may be required.

As described above, the present invention is directed to a microminiaturized, inexpensive, and high-resolution zoom optical system. The optical system as a whole is constituted of three lens groups, wherein zooming is performed by varying the distances between the respective lens groups in the optical axis direction.

As described in the foregoing embodiments, it is desirable that the first lens group (Gr1) closest to the object be composed of two lens elements. If the number of lens elements constituting the first lens group (Gr1) is less than two, correction on astigmatism, distortion aberration, and lateral chromatic aberration may be difficult, and error sensitivity of the lens group may be increased. It is necessary to weaken the optical power of the first lens group (Gr1) in order to eliminate these drawbacks. If, however, the optical power of the first lens group (Gr1) is attempted to be weakened, the diameter of a lens element in the first lens group including the forwardmost lens element is unduly increased, which hinders miniaturization of the optical system as a whole. On the other hand, if the number of lens elements constituting the first lens group (Gr1) is three or more, such an arrangement may not only raise the production cost but also result in increase of the number of lens elements having a large outer diameter and a heavy weight with a small moving distance, which may unduly increase the size of the lens driver for driving the lens group. In view of this, the first lens group (Gr1) is constituted of two lens elements in the embodiments.

Preferably, the first lens group (Gr1) is configured such that the negative lens element and the positive lens element are arrayed in this order from the object side. This arrangement adopts a so-called retro-focus system to secure back focus adjustment at the wide-angle end (W). Further, it is preferable to make a lens surface of the positive lens element convex to the object side, because such an arrangement desirably corrects astigmatism and contributes to image surface flatness.

Further, as compared with the other lens groups constituting the zoom optical system, the outer diameter of the first lens group (Gr1) is large. Accordingly, the load to the lens driver for driving the first lens group (Gr1) is the greatest among all the lens groups. Making all the lens elements constituting the first lens group (Gr1) of a plastic material enables to reduce the weight of the lens group, as compared with a lens group with a glass lens element or elements. Thus, the first lens group can be moved easily by a miniaturized lens driver, which makes it possible to miniaturize the optical system as a whole. However, merely replacing a glass lens element with a plastic lens element results in lowering of the optical performance. In the embodiments, substantially the same optical performance is secured by using aspherical lens elements. Further, since plastic lens elements can be mass-produced at a low cost according to die molding, production cost reduction can be realized.

Preferably, the second lens group (Gr2) adjacent the first lens group (Gr1) is constituted of two lens elements. If the number of lens elements constituting the second lens group (Gr2) is less than two, correction on spherical aberration, comma aberration, and axial chromatic aberration may be difficult, and error sensitivity of the lens group may be increased. On the other hand, if the number of lens elements constituting the second lens group (Gr2) is three or more, such an arrangement may not only raise the production cost but also increase the weight of the lens group, which may unduly increase the load of the lens driver, because the moving amount of the second lens group (Gr2) is the greatest among all the lens groups.

Preferably, the second lens group (Gr2) is configured such that the positive lens element and the negative lens element are arrayed in this order from the object side. Such an arrangement is preferred because the optical power of the second lens group (Gr2) can be substantially alleviated, and error sensitivity can be reduced, with the zooming effect being retained by making the principal point position of the second lens group (Gr2) closer to the first lens group (Gr1). Further preferably, the positive lens element is biconvex to strengthen the optical power of the second lens group (Gr2) and to reduce the moving distance of the second lens group (Gr2) in zooming.

It is preferred that each of the first lens group (Gr1) and the second lens group (Gr2) has two or more aspherical surfaces. The aspherical surface of the lens element in the first lens group (Gr1) primarily contributes to correct astigmatism and distortion aberration, and the aspherical surface of the lens element in the second lens group (Gr2) primarily contributes to correct spherical aberration. Use of two or more aspherical surfaces in each of the first and second lens groups (Gr1, Gr2) is preferred because use of a mono aspherical surface in each of the first and second lens groups (Gr1, Gr2) makes it difficult to obtain substantially the same effect of miniaturization as an optical system employing glass lens elements having a high refractive index.

Preferably, the third lens group (Gr3), which is closest to the image sensor (SR), has a positive lens element to make an off-axial ray onto the light receiving plane of the image sensor (SR) substantially parallel to an optical axis.

Further, it is preferred to set the exit pupil position of the optical system at the wide-angle end (W) closer to the object side rather than the image sensor side. This arrangement enables to miniaturize the optical system while securing a wide angle of view.

The third and fifth embodiments recite the examples of the bifocal optical system capable of achieving further miniaturization, as compared with a zoom optical system capable of continuous zooming. Since the arrangements of the optical systems in the third and fifth embodiments are the same as those in the first, second, fourth, sixth, seventh, eight, and ninth embodiments, it is possible to use a zoom optical system capable of continuous zooming as an altered arrangement in the third and fifth embodiments. Conversely to such an altered arrangement, it is possible to use the same bifocal optical system as in the third and the fifth embodiments in the first, second, fourth, sixth, seventh, eight, and ninth embodiments, in place of the optical system capable of continuous zooming in order to secure further miniaturization.

Further, it is possible to provide a mechanical shutter having a function of blocking light from being incident onto the image sensor (SR), in place of the aperture stop (ST) in the foregoing embodiments. The mechanical shutter is advantageous in preventing generation of smear, which may likely to appear in using a CCD sensor as an image sensor, for instance.

Next, the lens unit of driving the lens groups constituting the zoom optical system for zooming and focusing is described. The lens unit is an imaging lens unit incorporated with the inventive zoom optical system, and the lens driver for driving the lens groups. The following arrangement is applied to the first, second, fourth, eighth, and ninth embodiments shown in FIG. 10A, wherein the first lens group makes a u-turn, the second lens group is linearly moved, and the third lens group is unmoved.

Figure 20:
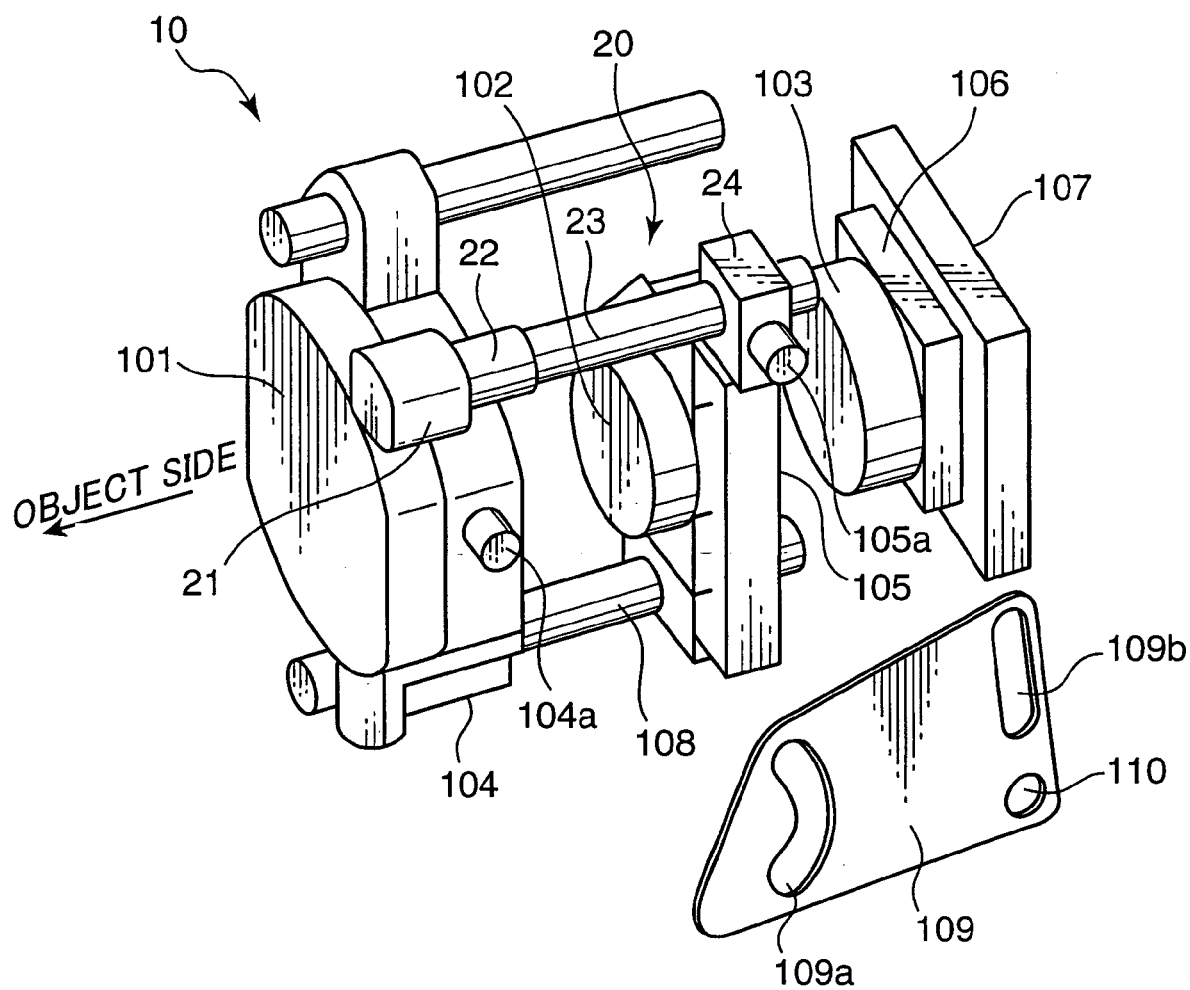
FIG. 20 is a perspective view of a lens unit having a mechanism for driving the lens groups constituting the zoom optical system for zooming and focusing.

FIG. 20 is a perspective view showing an exemplified internal arrangement of the lens unit 10. As shown in FIG. 20, the lens unit 10 comprises a first lens group 101, a second lens group 102, and a third lens group 103 arrayed in an optical axis direction in this order from the subject (object) side. The first lens group 101, the second lens group 102, and the third lens group 103 are respectively supported on support members 104, 105, and 106. A plane-parallel plate (not shown) and an image sensor (not shown) are fixedly supported on a fixing member 107 at a central part thereof. The third lens group 103 and the support member 106 are fixed on the fixing member 107 for supporting the image sensor. The fixing member 107 is fixed to an unillustrated camera phone body. A rod-like guide member 108 is passed through the support member 104 for supporting the first lens group 101 and the support member 105 for supporting the second lens group 102 by engagement of engaging portions 104a, 105a arranged at appropriate positions on the support members 104, 105 in guide grooves 109a, 109b formed in a cam member 109. An unillustrated rod fixed to the camera phone body is received in a fitting hole 110 formed in the cam member 109.

A driving unit 20 constituted of, e.g., an impact type piezoelectric actuator is mounted on the support member 105 for supporting the second lens group 102. The second lens group 102 is driven in the optical axis direction by way of the support member 105 by a driving section including the driving unit 20. Specifically, the driving unit 20 is constituted of a support member 21, a piezoelectric device 22, a driving rod 23, and an engaging member 24. The support member 21 is fixed to the unillustrated camera phone body to hold the piezoelectric device 22 and the driving rod 23 thereon. The piezoelectric device 22 is mounted on the support member 21 in such a manner that polarizing directions thereof, namely, expanding/contracting directions thereof coincide with an axial direction of the support member 21. An end of the driving rod 23 is fixed to the piezoelectric device 22, and the other end thereof is fixed to a side wall of the engaging member 24.

In the above construction, an incident ray from the object side is passed through the first lens group 101, the second lens group 102, and the third lens group 103 in this order to form an optical image of the object. The optical image formed through the lens groups 101, 102, 103 is passed through the unillustrated plane-parallel plate adjacent the third lens group 103, and finally converted into an electrical signal by the unillustrated image sensor.

In the following, the mechanism as to how the lens groups are driven for zooming and focusing is described. First, let it be assumed that the lens unit 10 in FIG. 20 is located at the mid point (M) shown in FIG. 10A. At this time, let it be assumed that the engaging portion 104a (105a) is located at an intermediate position of the guide groove 109a (109b). In zooming from the mid point (M) to the wide-angle end (W), a cyclic voltage of a serrated waveform is applied to the piezoelectric device 22 by unillustrated driving means. As a result, the piezoelectric device 22 expands in the optical axis direction on a moderate gradient side of the voltage waveform. The expansion is conveyed to the engaging member 24 which is interconnected with the piezoelectric device 22 by way of the driving rod 23. Since the engaging member 24 is interconnected with the support member 105 for supporting the second lens group 102, the second lens group 102 is moved toward the image sensor side. Namely, slipping occurs on a sharp gradient side of the voltage waveform. As a result, the engaging portion 105a slides upward in the guide groove 109b, and the cam member 109 is rotated clockwise around a center of the fitting hole 110 in association with the engagement of the engaging portion 105a in the guide groove 109b. At this time, the engaging portion 104a is moved downward in the engaging groove 109a in association with the engagement of the engaging portion 104a in the engaging groove 109a, with the result that the distance between the first lens group 101 and the second lens group 102 is varied in such a manner as to depict a trajectory as shown in FIG. 10A. Specifically, the guide groove 109a has a curvature configuration, and the guide groove 109b has a linear configuration to cause the first lens group 101 and the second lens group 102 to depict desired trajectories as shown in FIG. 10A, respectively.

Similarly, in case of zooming from the mid point (M) to the telephoto end (T), a cyclic voltage of a serrated waveform having a gradient opposite to the case of zooming from the mid point (M) to the wide-angle end (W) is applied to the piezoelectric device 22 by the unillustrated driving means, and the piezoelectric device 22 is contracted in the optical axis direction. The contraction is conveyed to the engaging member 24 interconnected with the piezoelectric device 22 by way of the driving rod 23 to thereby move the second lens group 102 toward the object side. As a result, the engaging portion 105a slides upward in the guide groove 109b, and the cam member 109 is rotated counterclockwise around the center of the fitting hole 110 in association with the engagement of the engaging portion 105a in the guide groove 109b. At this time, the engaging portion 104a is moved upward in the engaging groove 109a in association with the engagement of the engaging portion 104a in the engaging groove 109a, with the result that the distance between the first lens group 101 and the second lens group 102 is varied in such a manner as to depict a trajectory as shown in FIG. 10A In this way, in both of the cases of zooming toward the wide-angle end (W) and toward the telephoto end (T), the distance between the first lens group 101 and the second lens group 102 can be desirably controlled by the guide grooves 109a, 109b formed in the cam member 109.

As described in the embodiments, the second lens group 102 is linearly moved toward the object side or the image sensor side by forming the guide groove 109b into a linear shape, whereby zooming of the optical system is allowed by the second lens group 102. It is essential that the guide groove 109a for driving the first lens group 101 has such a shape as to move the first lens group 101 to a position where focusing is performed while the second lens group 102 is driven for zooming. In other words, with the respective configurations of the guide grooves 109a, 109b, the second lens group 102 is primarily driven for zooming, and the first lens group 101 is primarily driven for focusing.

The above arrangement is proposed to execute the first, the second, fourth, eighth, and ninth embodiments shown in FIG. 10A. It is possible to execute the third and seventh embodiment by changing the configuration of the guide groove 109a. Further, the cam structure is applicable to the second and third lens groups. By applying the cam structure to the second and the third lens group, it is possible to execute the fifth and sixth embodiments, wherein the first lens group is unmoved, and the second and the third lens groups are moved as mentioned above.

Further, it is possible to simultaneously drive the first, the second, and the third lens groups by forming three guide grooves in the cam member 109. Furthermore, the configuration of the cam member 109 is not limited to the above, but any other shape such as a commonly used cylindrical shape is usable.

It is possible to use a stepping motor or a like device to drive the respective lens groups or the aperture stop. Alternatively, in the case where a moving distance of the lens group is small, or the weight of the lens group is light, a micro piezoelectric actuator may be used independently for each of the lens groups. Such an arrangement not only enables to drive the lens groups independently of each other but also attains further miniaturization of the imaging lens unit as a whole, while suppressing increase of the volume and power consumption of the driving section.

PRACTICAL EXAMPLES

Example 1

Construction data on the respective lens elements in the first embodiment (Example 1) are described in Table 1. It should be noted that all the lens elements in Examples 1 through 9 are made of a plastic material.

TABLE 1

| lens surface | radius of curvature (mm) | axial distance between surfaces (mm) | | | reflective index | Abbe number |
|---|---|---|---|---|---|---|
| | | W | M | T | | |
| r1* | −26.428 | 0.800 | | | 1.53048 | 55.72 |
| r2* | 4.604 | 1.341 | | | | |
| r3 | 6.720 | 1.818 | | | 1.58340 | 30.23 |
| r4 | 14.31 | 10.710 | 2.974 | 0.500 | | |
| r5 | ∞ | | | | | |
| r6 | 2.765 | 1.499 | | | 1.53048 | 55.72 |
| r7* | −5.275 | 0.500 | | | | |
| r8* | −2.838 | 0.998 | | | 1.58340 | 30.23 |
| r9* | 36.048 | 1.677 | 5.691 | 9.343 | | |
| r10* | 9.723 | 1.616 | | | 1.53048 | 55.72 |
| r11* | −27.313 | 1.895 | | | | |
| r12 | ∞ | 1.000 | | | 1.51680 | 64.20 |
| r13 | ∞ | 1.146 | | | | |
| r14 | ∞ | | | | | |

| lens surface | conical coefficient | aspheric coefficient | | | |
|---|---|---|---|---|---|
| | | A | B | C | D |
| r1* | 0 | 6.23E−04 | −5.02E−06 | 6.61E−08 | 7.46E−10 |
| r2* | 0 | −3.92E−04 | 5.86E−05 | −4.11E−06 | 9.23E−08 |
| r7* | 0 | 7.11E−03 | 2.01E−04 | −2.94E−04 | 3.24E−05 |
| r8* | 0 | 2.80E−02 | −3.15E−03 | 2.27E−05 | 1.84E−05 |
| r9* | 0 | 2.56E−02 | −7.98E−04 | 3.76E−04 | 3.43E−05 |
| r10* | 0 | 1.98E−03 | −7.44E−05 | 4.54E−05 | −1.19E−06 |
| r11* | 0 | 4.13E−03 | −3.55E−04 | 6.80E−05 | 1.09E−06 |

Table 1 indicates, from the left-side column thereof, the respective lens surface numbers, radii of curvature (unit: mm) of the respective lens surfaces, distances (unit: mm) between the respective lens surfaces in the optical axis direction, namely, axial distances between the respective surfaces, at the wide-angle end (W), the mid point (M), and the telephoto end (T), reflective indices of the respective lens elements, and the Abbe numbers of the respective lens elements. The blank columns regarding the axial distance between the surfaces at the mid point (M) and the telephoto end (T) represent that the value within the blank column is the same as that in the left-side column at the wide-angle end (W). As shown in FIG. 1, ri (i=1, 2, 3, . . . ) indicates the i-th lens surface from the object side, and a surface ri marked with an asterisk (*) is an aspherical surface. In Example 1, the first, the fourth, and the fifth lens elements from the object side are bi-aspherical lens elements, and the third lens element from the image sensor (SR) side is a mono aspherical lens element. Further, since the aperture stop (ST), both sides of the plane-parallel plate (PL) and the light receiving plane of the image sensor (SR) are flat, respective radii of curvature thereof are infinite (∞).

The aspherical configuration of the lens element is defined by the following conditional formula (17), wherein the apex of the lens surface is represented as the point of origin, and a local orthogonal coordinate system (x, y, z), with the direction from the object toward the image sensor being the positive z-axis direction is used.

$$z = \frac{c \cdot h^2}{1 + SQRT\{1 - (1+k)c^2 \cdot h^2\}} + A \cdot h^4 + B \cdot h^6 + C \cdot h^8 + D \cdot h^{10} + E \cdot h^{12} + F \cdot h^{14} + G \cdot h^{16} + H \cdot h^{18} + J \cdot h^{20} \quad (17)$$

where z represents z-axis displacement at the height position h (relative to the apex of the lens surface), h represents the height in a direction perpendicular to the z-axis ($h^2 = x^2 + y^2$), c represents a curvature near the apex of the lens surface (=1/radius of curvature), A, B, C, D, E, F, G, H, and J respectively represent aspheric coefficients of 4th, 6th, 8th, 10th, 12th, 14th, 16th, 18th, and 20th orders, and k represents a conical coefficient.

Table 1 shows the conical coefficient k, and the aspheric coefficients A, B, C, and D. Although not shown in Table 1, the aspheric coefficients E, F, G, H, and J are each 0. As is obvious from the conditional formula (17), the radii of curvature of the respective aspheric lens elements shown in Table 1 each show a value approximate to the center of the corresponding lens element.

The spherical aberration (LONGITUDINAL SPHERICAL ABERRATION in FIGS. 11A, 11D, and 11G), the astigmatism (ASTIGMATISM in FIGS. 11B, 11E, and 11I), and the distortion aberration (DISTORTION in FIGS. 11C, 11F, and 11I) of all the lens groups constituted of the first, the second, and the third lens groups in Example 1 having the above lens group arrangement and the construction are shown in FIGS. 11A through 11I. Specifically, the respective aberrations at the wide-angle end (W), the mid point (M), and the telephoto end (T) are shown in the uppermost row, the intermediate row, and the lowermost row in FIG. 11A through 11I. Each of the horizontal axes in the spherical aberration diagrams and the astigmatism diagrams shows a focal point displacement in the unit of mm. Each of the horizontal axes in the distortion aberration diagrams shows a distortion in terms of percentage. Each of the vertical axes in the spherical aberration diagrams shows a value standardized by the incident height, each of the vertical axes in the astigmatism diagrams and the distortion aberration diagrams shows the height of an optical image (image height) in the unit of mm. In the spherical aberration diagrams, aberrations in case of using light of three different wavelengths are shown, wherein the broken lines represent aberrations in a red ray (wavelength: 656.27 nm), the solid lines represent aberrations in a yellow ray (so-called "d-ray" having a wavelength of 587.56 nm), and the two-dotted-chain lines represent aberrations in a blue ray (wavelength: 435.83 nm). In the astigmatism diagrams, the symbols "S" and "1" respectively represent results on sagittal (radial) plane and tangential (meridional) plane. Further, the astigmatism diagrams and the distortion aberration diagrams show results of using the yellow ray (d-ray). As is obvious from FIGS. 11A through 11I, the lens groups in Example 1 exhibit superior optical characteristics, wherein the color aberration and the astigmatism each fall within 0.1 mm, and the distortion aberration is not larger than 5% at all the positions, namely, at the wide-angle end (W), the mid point (W), and the telephoto end (T).

The focal lengths (unit: mm) and the F-numbers at the wide-angle end (W), the mid point (M), and the telephoto end (T) in Example 1 are shown in Table 10 and Table 11, respectively. Tables 10 and 11 show that Example 1 provides a bright optical system of a short focal length.

TABLE 10

| | Focal length (mm) | | |
|---|---|---|---|
| | W | M | T |
| Example 1 | 4.1 | 8.1 | 11.8 |
| Example 2 | 5.3 | 8.5 | 13.3 |
| Example 3 | 4.6 | — | 8.7 |
| Example 4 | 3.7 | 7.2 | 10.5 |
| Example 5 | 4.6 | — | 8.7 |
| Example 6 | 3.8 | 7.5 | 10.9 |
| Example 7 | 3.6 | 7.0 | 10.2 |
| Example 8 | 3.9 | 7.8 | 11.3 |
| Example 9 | 4.0 | 7.9 | 11.4 |

TABLE 11

| | F-number | | |
|---|---|---|---|
| | W | M | T |
| Example 1 | 2.7 | 3.8 | 4.8 |
| Example 2 | 3.4 | 4.3 | 5.7 |
| Example 3 | 4.1 | — | 5.9 |
| Example 4 | 2.6 | 3.7 | 4.8 |
| Example 5 | 3.9 | — | 5.9 |
| Example 6 | 2.5 | 4.0 | 4.8 |
| Example 7 | 3.0 | 3.9 | 4.8 |
| Example 8 | 2.7 | 3.8 | 4.8 |
| Example 9 | 2.7 | 3.7 | 4.8 |

Example 2

Construction data on the respective lens elements in the second embodiment (Example 2) are described in Table 2. All the lens elements in Example 2 are bi-aspherical lens elements.

TABLE 2

| lens surface | radius of curvature (mm) | axial distance between surfaces (mm) W | M | T | reflective index | Abbe number |
|---|---|---|---|---|---|---|
| r1* | −37.132 | 0.800 | | | 1.53048 | 55.72 |
| r2* | 3.958 | 1.051 | | | | |
| r3* | 5.333 | 1.799 | | | 1.58340 | 30.23 |
| r4* | 10.041 | 7.315 | 3.051 | 0.500 | | |
| r5 | ∞ | 0.100 | | | | |
| r6* | 4.005 | 2.122 | | | 1.53048 | 55.72 |
| r7* | −3.023 | 0.100 | | | | |
| r8* | −5.949 | 1.610 | | | 1.58340 | 30.23 |
| r9* | 5.002 | 1.300 | 4.447 | 9.206 | | |
| r10* | 5.914 | 2.955 | | | 1.53048 | 55.72 |
| r11* | 7.328 | 2.758 | | | | |
| r12 | ∞ | 0.500 | | | 1.51680 | 64.20 |
| r13 | ∞ | 0.500 | | | | |
| r14 | ∞ | | | | | |

| lens surface | conical coefficient | aspheric coefficient A | B | C | D | E |
|---|---|---|---|---|---|---|
| r1* | 0 | 2.65E−03 | −1.29E−04 | −2.61E−08 | 5.96E−08 | 5.49E−10 |
| r2* | 0 | 5.30E−04 | 4.94E−04 | 6.15E−06 | −8.20E−06 | 3.51E−07 |
| r3* | 0 | −3.22E−03 | 6.65E−04 | −7.59E−05 | 4.56E−06 | −9.04E−08 |
| r4* | 0 | −2.22E−03 | 1.62E−04 | −3.29E−05 | 4.00E−06 | −8.53E−08 |
| r6* | 0 | −4.20E−03 | −8.38E−04 | 4.93E−05 | −7.82E−05 | 3.13E−06 |
| r7* | 0 | 9.73E−03 | 1.03E−03 | −1.50E−03 | 3.55E−04 | −2.90E−05 |
| r8* | 0 | 2.84E−03 | 3.25E−03 | −2.08E−03 | 4.92E−04 | −3.47E−05 |
| r9* | 0 | −1.56E−04 | 2.14E−03 | −4.62E−04 | 7.05E−05 | −2.23E−06 |
| r10* | 0 | 8.84E−04 | 2.71E−06 | 2.88E−06 | −3.71E−07 | 1.77E−08 |
| r11* | 0 | 4.14E−03 | −4.93E−04 | 1.37E−04 | −1.50E−05 | 6.63E−07 |

Example 3

Construction data on the respective lens elements in the third embodiment (Example 3) are described in Table 3. In Example 3, the first, the second, the third, and the fifth lens elements are bi-aspherical lens elements, and the fourth lens element from the image sensor (SR) side is a mono aspherical lens element.

TABLE 3

| lens surface | radius of curvature (mm) | axial distance between surfaces (mm) W | T | reflective index | Abbe number |
|---|---|---|---|---|---|
| r1* | 85.117 | 0.800 | | 1.53048 | 55.72 |
| r2* | 2.710 | 0.920 | | | |
| r3* | 5.019 | 0.940 | | 1.58340 | 30.23 |
| r4* | 9.119 | 4.910 | 1.400 | | |
| r5 | ∞ | 0.200 | | | |
| r6* | 3.298 | 1.680 | | 1.53048 | 55.72 |
| r7* | −2.242 | 0.200 | | | |
| r8 | −7.837 | 1.380 | | 1.58340 | 30.23 |
| r9* | 2.526 | 3.210 | 6.720 | | |
| r10* | 7.660 | 1.360 | | 1.53048 | 55.72 |
| r11* | 68.988 | 1.100 | | | |
| r12 | ∞ | 0.300 | | 1.51680 | 64.20 |
| r13 | ∞ | 0.500 | | | |
| r14 | ∞ | | | | |

| lens surface | conical coefficient | aspheric coefficient A | B | C | D | E |
|---|---|---|---|---|---|---|
| r1* | 0 | 2.79E−03 | −5.63E−04 | 3.10E−05 | −1.46E−06 | 8.93E−08 |
| r2* | 0 | 2.70E−03 | −2.07E−04 | −2.80E−04 | 7.01E−06 | 0.00E+00 |
| r3* | 0 | 3.39E−04 | −1.84E−03 | 4.13E−05 | 8.14E−05 | −8.70E−06 |
| r4* | 0 | −2.40E−03 | −2.90E−03 | 5.93E−04 | 9.05E−06 | −6.14E−06 |
| r6* | 0 | −1.37E−02 | −3.81E−03 | −3.52E−04 | −7.40E−04 | 0.00E+00 |
| r7* | 0 | 2.00E−02 | −6.13E−03 | 6.12E−04 | −2.34E−04 | 0.00E+00 |
| r9* | 0 | −1.30E−02 | 5.46E−03 | 1.24E−04 | −4.09E−04 | 0.00E+00 |

TABLE 3-continued

| | | | | | | |
|---|---|---|---|---|---|---|
| r10* | 0 | −2.68E−03 | 9.66E−05 | 2.60E−05 | −5.28E−07 | 0.00E+00 |
| r11* | 0 | −4.79E−04 | −5.92E−04 | 1.03E−04 | −2.70E−06 | 0.00E+00 |

Example 4

Construction data on the respective lens elements in the fourth embodiment (Example 4) are described in Table 4. As is obvious from Table 4, the first, the second, the third, the fifth, and the sixth lens elements in Example 4 are bi-aspherical lens elements.

TABLE 4

| lens surface | radius of curvature (mm) | axial distance between surfaces (mm) | | | reflective index | Abbe number |
|---|---|---|---|---|---|---|
| | | W | M | T | | |
| r1* | 53.804 | 0.800 | | | 1.53048 | 55.72 |
| r2* | 3.657 | 1.588 | | | | |
| r3* | 4.559 | 1.454 | | | 1.58340 | 30.23 |
| r4* | 5.233 | 6.822 | 2.030 | 0.500 | | |
| r5 | ∞ | 0.000 | | | | |
| r6* | 4.408 | 1.092 | | | 1.53048 | 55.72 |
| r7* | −17.312 | 0.300 | | | | |
| r8 | 4.493 | 1.307 | | | 1.53048 | 55.72 |
| r9 | −5.007 | 0.500 | | | | |
| r10* | −2.315 | 0.800 | | | 1.58340 | 30.23 |
| r11* | 11.068 | 0.500 | 3.806 | 6.822 | | |
| r12* | 6.801 | 1.687 | | | 1.53048 | 55.72 |
| r13* | −67.629 | 0.500 | | | | |
| r14 | ∞ | 2.000 | | | 1.51680 | 64.20 |
| r15 | ∞ | 0.650 | | | | |
| r16 | ∞ | | | | | |

| lens surface | conical coefficient | aspheric coefficient | | | |
|---|---|---|---|---|---|
| | | A | B | C | D |
| r1* | 0 | 2.75E−03 | −8.62E−05 | −1.38E−06 | 7.70E−08 |
| r2* | 0 | 2.79E−04 | 5.43E−04 | 1.71E−05 | −4.39E−06 |
| r3* | 0 | −5.89E−03 | 5.32E−04 | −1.28E−05 | −1.01E−06 |
| r4* | 0 | −6.33E−03 | 3.55E−04 | 5.45E−07 | −1.36E−06 |
| r6* | 0 | −6.16E−03 | −1.06E−03 | −1.71E−04 | −2.27E−05 |
| r7* | 0 | −6.05E−03 | −7.74E−04 | −1.58E−04 | 8.26E−06 |
| r10* | 0 | 4.69E−02 | −1.01E−02 | 2.48E−03 | −1.25E−04 |
| r11* | 0 | 4.68E−02 | −6.73E−03 | 1.30E−03 | 1.03E−04 |
| r12* | 0 | 1.73E−03 | 1.34E−04 | 6.64E−06 | −1.93E−06 |
| r13* | 0 | 3.72E−03 | −3.63E−04 | 8.98E−05 | −8.84E−06 |

Example 5

Construction data on the respective lens elements in the fifth embodiment (Example 5) are described in Table 5. As is obvious from Table 5, all the lens elements in Example 5 are bi-aspherical lens elements.

TABLE 5

| lens surface | radius of curvature (mm) | axial surface distance (mm) | | reflective index | Abbe number |
|---|---|---|---|---|---|
| | | W | T | | |
| r1* | −11.329 | 0.800 | | 1.53048 | 55.72 |
| r2* | 5.233 | 0.726 | | | |
| r3* | 20.274 | 0.800 | | 1.58340 | 30.23 |
| r4* | −33.382 | 3.926 | 0.500 | | |
| r5 | ∞ | 0.200 | | | |
| r6* | 2.465 | 1.771 | | 1.53048 | 55.72 |
| r7* | −2.541 | 0.200 | | | |
| r8* | −7.837 | 0.893 | | 1.58340 | 30.23 |
| r9* | 1.975 | 1.000 | 5.239 | | |

TABLE 5-continued

| | | | | | |
|---|---|---|---|---|---|
| r10* | 36.047 | 1.594 | | 1.53048 | 55.72 |
| r11* | −5.738 | 2.290 | 1.477 | | |
| r12 | ∞ | 0.300 | | 1.51680 | 64.20 |
| r13 | ∞ | 0.500 | | | |
| r14 | ∞ | | | | |

| lens surface | conical coefficient | aspheric coefficient | | | | |
|---|---|---|---|---|---|---|
| | | A | B | C | D | E |
| r1* | 0 | 4.01E−03 | −5.63E−04 | 2.09E−05 | −8.22E−07 | 1.32E−07 |
| r2* | 0 | 6.19E−03 | 3.48E−04 | −3.83E−04 | 2.39E−05 | 0.00E+00 |
| r3* | 0 | 2.19E−03 | −1.14E−03 | −1.49E−04 | 1.11E−04 | −1.28E−05 |
| r4* | 0 | −5.81E−04 | −1.90E−03 | 3.32E−04 | 5.21E−05 | −1.02E−05 |
| r6* | 0 | −7.78E−03 | −3.28E−03 | 4.14E−04 | −1.18E−03 | 0.00E+00 |
| r7* | 0 | 2.36E−02 | −1.59E−03 | 1.12E−03 | −1.08E−04 | 0.00E+00 |
| r8* | 0 | −2.26E−02 | −6.47E−03 | −4.16E−03 | 1.22E−03 | 0.00E+00 |
| r9* | 0 | −4.04E−02 | 1.16E−02 | −4.67E−03 | 5.95E−04 | 0.00E+00 |
| r10* | 0 | 6.51E−04 | −2.99E−04 | 3.24E−05 | −1.33E−06 | 0.00E+00 |
| r11* | 0 | 2.70E−03 | −5.94E−04 | 5.17E−05 | −1.82E−06 | 0.00E+00 |

Example 6

Construction data on the respective lens elements in the sixth embodiment (Example 6) are described in Table 6. As is obvious from Table 6, all the lens elements in Example 6 are bi-aspherical lens elements.

TABLE 6

| lens surface | radius of curvature (mm) | axial distance between surfaces (mm) | | | reflective index | Abbe number |
|---|---|---|---|---|---|---|
| | | W | M | T | | |
| r1* | −27.645 | 0.800 | | | 1.53048 | 55.72 |
| r2* | 4.117 | 1.443 | | | | |
| r3* | 6.240 | 2.659 | | | 1.58340 | 30.23 |
| r4* | 14.931 | 8.334 | 3.773 | 0.504 | | |
| r5 | ∞ | 0.000 | | | | |
| r6* | 2.884 | 1.517 | | | 1.53048 | 55.72 |
| r7* | −3.126 | 0.500 | | | | |
| r8* | −2.106 | 1.465 | | | 1.58340 | 30.23 |
| r9* | 26.730 | 0.500 | 6.700 | 9.469 | | |
| r10* | 10.608 | 1.994 | | | 1.53048 | 55.72 |
| r11* | −8.902 | 2.139 | 0.500 | 0.999 | | |
| r12 | ∞ | 1.000 | | | 1.51680 | 64.20 |
| r13 | ∞ | 0.650 | | | | |
| r14 | ∞ | | | | | |

| lens surface | conical coefficient | aspheric coefficient | | | |
|---|---|---|---|---|---|
| | | A | B | C | D |
| r1* | 0 | 1.52E−03 | −3.98E−05 | −2.33E−07 | 2.09E−08 |
| r2* | 0 | −1.04E−03 | 1.78E−04 | −3.38E−06 | −6.21E−07 |
| r3* | 0 | −1.68E−03 | 1.27E−04 | 2.89E−06 | −8.36E−08 |
| r4* | 0 | −1.21E−03 | 8.39E−05 | 3.80E−06 | 3.72E−07 |
| r6* | 0 | −5.53E−03 | −7.16E−04 | 7.08E−05 | −5.77E−05 |
| r7* | 0 | 1.58E−02 | 7.34E−04 | −5.91E−04 | 5.24E−05 |
| r8* | 0 | 6.57E−02 | −4.43E−03 | −3.37E−04 | 3.15E−04 |
| r9* | 0 | 3.71E−02 | 2.23E−04 | −4.49E−04 | 1.11E−04 |
| r10* | 0 | −5.08E−04 | −2.19E−04 | 8.47E−05 | −3.17E−06 |
| r11* | 0 | 6.27E−04 | −9.35E−04 | 1.96E−04 | −6.45E−06 |

Example 7

Construction data on the respective lens elements in the seventh embodiment (Example 7) are described in Table 7. As is obvious from Table 7, in Example 7, the first, the fourth, and the fifth lens elements are bi-aspherical lens elements, and the second lens element from the object side, and the third lens element from the image sensor (SR) side are mono aspherical lens elements.

TABLE 7

| lens surface | radius of curvature (mm) | axial distance between surfaces (mm) | | | reflective index | Abbe number |
|---|---|---|---|---|---|---|
| | | W | M | T | | |
| r1* | −26.958 | 2.028 | | | 1.53048 | 55.72 |
| r2* | 6.919 | 1.113 | | | | |
| r3* | 5.459 | 2.651 | | | 1.58340 | 30.23 |
| r4 | 7.046 | 13.523 | 3.345 | 0.100 | | |
| r5 | ∞ | 0.000 | | | | |
| r6 | 2.773 | 1.439 | | | 1.53048 | 55.72 |
| r7* | −5.059 | 0.500 | | | | |
| r8* | −2.310 | 1.306 | | | 1.58340 | 30.23 |
| r9* | −15.521 | 0.189 | 3.104 | 5.781 | | |
| r10* | 6.186 | 3.495 | | | 1.53048 | 55.72 |
| r11* | 32.775 | 0.882 | | | | |
| r12 | ∞ | 1.000 | | | 1.51680 | 64.20 |
| r13 | ∞ | 0.795 | | | | |
| r14 | ∞ | | | | | |

| lens surface | conical coefficient | aspheric coefficient | | | |
|---|---|---|---|---|---|
| | | A | B | C | D |
| r1* | 0 | 2.38E−03 | −7.71E−05 | 1.18E−06 | −7.31E−09 |
| r2* | 0 | 5.73E−03 | 2.10E−05 | −9.98E−06 | 1.76E−07 |
| r3* | 0 | 2.21E−03 | −9.00E−05 | 1.90E−06 | −6.81E−08 |
| r7* | 0 | 8.64E−03 | 2.59E−05 | −1.21E−03 | 4.07E−04 |
| r8* | 0 | 4.11E−02 | −4.62E−03 | −5.37E−04 | 4.75E−04 |
| r9* | 0 | 2.78E−02 | −8.52E−04 | 1.57E−04 | 6.11E−05 |
| r10* | 0 | 1.86E−03 | 1.51E−04 | −2.55E−06 | 1.49E−08 |
| r11* | 0 | 9.02E−03 | −2.63E−03 | 6.35E−04 | −3.99E−05 |

Example 8

Construction data on the respective lens elements in the eighth embodiment (Example 8) are described in Table 8. As is obvious from Table 8, in Example 8, the first, the fourth, and the fifth lens elements are bi-aspherical lens elements, and the third lens element from the image sensor (SR) side is a mono aspherical lens element.

TABLE 8

| lens surface | radius of curvature (mm) | axial distance between surfaces (mm) | | | reflective index | Abbe number |
|---|---|---|---|---|---|---|
| | | W | M | T | | |
| r1* | −18.108 | 0.800 | | | 1.49300 | 58.34 |
| r2* | 4.631 | 1.401 | | | | |
| r3 | 7.014 | 1.835 | | | 1.58340 | 30.23 |
| r4 | 14.740 | 10.730 | 3.236 | 0.800 | | |
| r5 | ∞ | 0.000 | | | | |
| r6 | 2.572 | 1.650 | | | 1.49300 | 58.34 |
| r7* | −5.153 | 0.500 | | | | |
| r8* | −2.738 | 1.053 | | | 1.58340 | 30.23 |
| r9* | 61.133 | 1.055 | 5.419 | 9.321 | | |
| r10* | 25.149 | 1.451 | | | 1.53048 | 55.72 |
| r11* | −8.150 | 2.137 | | | | |
| r12 | ∞ | 1.000 | | | 1.51680 | 64.20 |
| r13 | ∞ | 1.388 | | | | |
| r14 | ∞ | | | | | |

| lens surface | conical coefficient | aspheric coefficient | | | |
|---|---|---|---|---|---|
| | | A | B | C | D |
| r1* | 0 | 6.70E−04 | −4.19E−06 | −1.93E−07 | 6.86E−09 |
| r2* | 0 | −7.45E−04 | 6.56E−05 | −4.85E−06 | 7.14E−08 |
| r7* | 0 | 1.01E−02 | −3.58E−04 | −4.88E−04 | 6.30E−05 |
| r8* | 0 | 2.94E−02 | −4.66E−03 | −1.64E−04 | 8.16E−05 |
| r9* | 0 | 2.51E−02 | −1.03E−03 | 1.76E−04 | 1.25E−04 |
| r10* | 0 | 1.89E−03 | −1.93E−04 | 4.16E−05 | −6.31E−07 |
| r11* | 0 | 3.71E−03 | −3.79E−04 | 4.33E−05 | 7.54E−07 |

Example 9

Construction data on the respective lens elements in the ninth embodiment (Example 9) are described in Table 9. As is obvious from Table 9, in Example 9, the first, the fourth, and the fifth lens elements are bi-aspherical lens elements, and the third lens element from the image sensor (SR) side is a mono aspherical lens element.

TABLE 9

| lens surface | radius of curvature (mm) | axial distance between surfaces (mm) | | | reflective index | Abbe number |
|---|---|---|---|---|---|---|
| | | W | M | T | | |
| r1* | −26.846 | 0.800 | | | 1.53048 | 55.72 |
| r2* | 4.476 | 1.293 | | | | |
| r3 | 6.361 | 1.815 | | | 1.58340 | 30.23 |
| r4 | 12.521 | 10.510 | 3.153 | 0.800 | | |
| r5 | 2.777 | 1.519 | | | | |
| r6* | −5.287 | 0.500 | | | 1.53048 | 55.72 |
| r7* | −2.707 | 0.996 | | | | |
| r8* | 652.864 | 0.000 | | | 1.58340 | 30.23 |
| r9 | ∞ | 1.502 | 5.636 | 9.396 | | |
| r10* | 7.766 | 2.670 | | | 1.53048 | 55.72 |
| r11* | −130.729 | 1.571 | | | | |
| r12 | ∞ | 1.000 | | | 1.51680 | 64.20 |
| r13 | ∞ | 0.823 | | | | |
| r14 | ∞ | | | | | |

| lens surface | conical coefficient | aspheric coefficient | | | |
|---|---|---|---|---|---|
| | | A | B | C | D |
| r1* | 0 | 6.06E−04 | −4.34E−06 | −3.11E−08 | 3.14E−09 |
| r2* | 0 | −3.03E−04 | 1.46E−05 | −2.13E−07 | −5.75E−08 |
| r6* | 0 | 7.50E−03 | −1.09E−04 | −1.61E−04 | 2.02E−05 |
| r7* | 0 | 3.24E−02 | −3.60E−03 | 2.38E−05 | 6.98E−05 |
| r8* | 0 | 2.75E−02 | −2.86E−04 | −2.23E−04 | 2.01E−04 |
| r10* | 0 | 1.58E−03 | −5.13E−05 | 2.62E−05 | −8.92E−07 |
| r11* | 0 | 4.53E−03 | −3.69E−04 | 5.14E−05 | 2.46E−06 |

The spherical aberration (LONGITUDINAL SPHERICAL ABERRATION in FIGS. 12A, 12D, 12G, 13A, 13D, 14A, 14D, 14G, 15A, 15D, 16A, 16D, 16G, 17A, 17D, 17G, 18A, 18D, 18G, 19A, 19D, and 19G), the astigmatism (ASTIGMATISM in FIGS. 12B, 12E, 12H, 13B, 13E, 14B, 14E, 14H, 15B, 15E, 16B, 16E, 16H, 17B, 17E, 17H, 18B, 18E, 18H, 19B, 19E, and 19H), and the distortion aberration (DISTORTION in FIGS. 12C, 12F, 12I, 13C, 13F, 14C, 14F, 14I, 15C, 15F, 16C, 16F, 16I, 17C, 17F, 17I, 18C, 18F, 18I, 19C, 19F, and 19I) of all the lens groups constituted of the first, the second, and the third lens groups in Examples 2 through 9 having the above lens group arrangement and the construction are shown in FIGS. 12A through 19I. The lens groups in Examples 2 through 9 exhibit superior optical characteristics, wherein the color aberration and the astigmatism each falls within 0.1 mm, and the distortion aberration is not larger than 5% at all the positions, namely, at the wide-angle end (W), the mid point (W), and the telephoto end (T).

The focal lengths (unit: mm) and the F-numbers at the wide-angle end (W), the mid point (M), and the telephoto end (T) in Examples 2 through 9 are shown in Table 10 and Table 11, respectively. Tables 10 and 11 show that Examples 2 through 9 each provides a bright optical system of a short focal length, as well as in Example 1.

Respective values of the conditional formulae (1), (3), (4), (5), (6), (7), (9), (10), (12), (14), and (15) obtained in Examples 1 through 9 are shown in Table 12. Table 12 clarifies that the inventive examples provide the aforementioned desirable values in all the formulae (1), (3), (4), (5), (6), (7), (9), (10), (12), (14), and (15).

TABLE 12

| | Ex 1 | Ex 2 | Ex 3 | Ex 4 | Ex 5 | Ex 6 | Ex 7 | Ex 8 | Ex 9 |
|---|---|---|---|---|---|---|---|---|---|
| formula (1) | 25.5 | 25.5 | 25.5 | 25.5 | 25.5 | 25.5 | 25.5 | 28.1 | 25.5 |
| formula (3) | 0.19 | 0.18 | 0.18 | 0.21 | 0.20 | 0.23 | 0.24 | 0.20 | 0.19 |
| formula (4) | 0.00079 | 0.00074 | 0.00151 | 0.00143 | 0.00118 | 0.00068 | 0.00048 | 0.00075 | 0.00085 |
| formula (5) | 0.0025 | 0.0025 | 0.0042 | 0.0038 | 0.0060 | 0.0043 | 0.0019 | 0.0028 | 0.0023 |
| formula (6) | 1.95 | 1.45 | 1.17 | 1.56 | 1.24 | 2.03 | 2.21 | 2.08 | 1.99 |
| formula (7) | 0.68 | 0.58 | 0.62 | 0.55 | 0.65 | 0.71 | 0.77 | 0.72 | 0.69 |
| formula (9) | 25.5 | 25.5 | 25.5 | 25.5 | 25.5 | 25.5 | 25.5 | 28.1 | 25.5 |
| formula (10) | 1.22 | 1.22 | 1.11 | — | 0.97 | 1.06 | 1.34 | 1.19 | 1.26 |
| formula (12) | 0.37 | 0.39 | 0.30 | 0.22 | 0.31 | 0.41 | 0.40 | 0.35 | 0.36 |

TABLE 12-continued

| | Ex 1 | Ex 2 | Ex 3 | Ex 4 | Ex 5 | Ex 6 | Ex 7 | Ex 8 | Ex 9 |
|---|---|---|---|---|---|---|---|---|---|
| formula (14) | 2.94 | 2.06 | 1.68 | 2.43 | 2.24 | 3.10 | 4.15 | 3.02 | 2.88 |
| formula (15) | 1.02 | 0.83 | 0.89 | 0.85 | 1.18 | 1.08 | 1.44 | 1.05 | 1.00 |

As described above, in the inventive zoom optical system, all the lens elements in the first lens group (Gr1) having the largest outer diameter among all the lens groups constituting the zoom optical system are made of a plastic material to reduce the load to the lens driver for driving the lens groups. This arrangement enables to realize production cost reduction of the optical system as a whole. It is preferred to make two or more lens elements in the second lens group (Gr2) of a plastic material, as well as the first lens group (Gr1). Since the moving distance of the second lens group (Gr1) during zooming is the largest among all the lens groups, use of the plastic lens elements in the second lens group (Gr2) is advantageous in reducing the load to the lens driver. The lens group arrangement is not limited to the above. Since the second lens group (Gr2) and the third lens group (Gr3) have a relatively small outer diameter, as compared with the first lens group (Gr1), it is possible to make all the lens elements in the first lens group (Gr1) and the third lens group (Gr3) of a glass material. Specifically, it is possible to make all the lens elements in the second lens group (Gr2) and/or the third lens group (Gr3) of a glass material. Furthermore, there is an idea of using one or more glass lens element in each of the second lens group (Gr2) and the third lens group (Gr3). In any case, the weight of the lens element does not cause a serious problem, and optical characteristics of the optical system as a whole can be improved.

As mentioned above, since the inventive imaging lens unit incorporated with the zoom optical system is compact and lightweight, it is possible to load the imaging lens unit in a digital apparatus such as a mobile phone. Thereby, still image shooting or moving image shooting can be performed with a desired zoom ratio. Further, since the imaging lens unit has such a high optical performance as to be compatible with an image sensor with 2 million pixels or more, the imaging lens unit is superior to an electronic zoom system in which interpolation is required.

The zoom optical systems of the respective embodiments employ a reflective lens element of deflecting incident rays by refraction, namely, a lens element of a deflective type in which rays are deflected at boundaries of media having different refractive indices from each other. The lens element usable in the embodiments is not limited to the above. Examples of the other lens element are a diffractive lens element of deflecting incident rays by diffraction, a reflective/diffractive hybrid lens element of deflecting incident rays by combination of diffraction and deflection, and a lens element of refraction index distribution type of deflecting incident rays based on a refraction index distribution in the medium. Alternatively, it is possible to arrange a light flux regulator or an equivalent device, in addition to the aperture stop (ST), according to needs.

To summarize the invention, an aspect of the present invention is directed to a zoom optical system for forming an optical image of an object onto a light receiving plane of an image sensor for converting the optical image into an electrical signal, and performing zooming by varying distances between lens groups in an optical axis direction. The zoom optical system comprises the lens groups including in the order from an object side: a first lens group having a negative optical power; a second lens group having a positive optical power; and a third lens group having a positive optical power, wherein the first lens group is composed of two or more lens elements including at least one positive lens element and at least one negative lens element, the second lens group is composed of two or more lens elements including at least one positive lens element and at least one negative lens element, and all the lens elements in the first lens group are made of a plastic material.

According to the above arrangement, the optical system is of a so-called negative power lead, wherein the first lens group closest to the object has a negative optical power. This arrangement enables to miniaturize the optical system, as compared with an optical system of a positive power lead. Further, this arrangement enables to suppress increase of error sensitivity, which is inevitable, as the system is miniaturized.

According to the above arrangement, the optical system is of a negative-positive-positive three-unit type comprising, in this order from the object side, the first lens group having a negative optical power, the second lens group having a positive optical power, and the third lens group having a positive optical power. This arrangement enables to reduce the moving distance of the second group, as compared with an optical system of a negative-positive two-unit type, and to make an off-axial ray onto the light receiving plane of the image sensor substantially parallel to an optical axis.

Generally, if the first lens group is composed of a single negative lens element, the optical power of the first lens group cannot be increased in order to suppress generation of lateral chromatic aberration, or field curvature in the first lens group. As a result, the diameter of a lens element in the first lens group including the forwardmost lens element is unduly increased. Constituting the first lens group of at least one negative lens element and at least one positive lens element, as proposed in the above arrangement, is advantageous in increasing the optical power of the first lens group, while suppressing generation of lateral chromatic aberration, or field curvature in the first lens group. Thus, this arrangement can prevent increase of the diameter of a lens element in the first lens group including the forwardmost lens element.

In the case of the optical system of a negative-positive-positive three unit type, the optical power of the second lens group adapted for zooming is strong, which may increase error sensitivity of the second lens group. In view of this, the second lens group is constituted of two or more lens elements. This arrangement enables to suppress the optical powers of the respective lens elements, thereby reducing error sensitivity of the second lens group. Further, constituting the second lens group of at least one positive lens element and at least one negative lens element makes it possible to correct axial chromatic aberration.

In addition to the above, since all the lens elements in the first lens group having a larger outer diameter as compared with the other lens groups are made of a plastic material, this arrangement contributes to production cost reduction, as compared with a case of using a glass lens element, and provides a lightweight optical system.

As mentioned above, the above arrangement provides the optical system of a so-called negative power lead comprising, in this order from the object side, the first lens group having a negative optical power, the second lens group having a positive optical power, and the third lens group having a negative optical power. This arrangement enables to realize miniaturization in the optical axis direction and in a radial direction perpendicular to the optical axis without increasing error sensitivity. This arrangement also enables to reduce the moving distance of the second lens group. Further, since all the lens elements in the first lens group having a larger outer diameter as compared with the other lens groups are made of the plastic material, it is possible to miniaturize the lens driver for driving the first lens group. Thus, miniaturization of the lens groups and the lens driver is achieved, which contributes to miniaturization of the entirety of the optical system.

In addition to the above, since the first lens group is composed of at least one negative lens element and at least one positive lens element, and the second lens group is composed of at least one positive lens element and at least one negative lens element, error sensitivity can be reduced while suppressing generation of various aberrations such as lateral chromatic aberration, axial chromatic aberration, or field curvature.

Preferably, the zoom optical system further comprises an aperture stop, wherein the aperture stop is moved with the second lens group toward the object side in zooming from a wide-angle end to a telephoto end.

According to the above arrangement, since the aperture stop is moved with the second lens group having the largest moving distance among all the lens groups in zooming from the wide-angle end to the telephoto end, this arrangement enables to suppress apparent increase of an outer diameter of the second lens group.

In the above arrangement, the aperture stop is moved toward the object side with the second lens group in zooming from the wide-angle end to the telephoto end. This arrangement enables to suppress drawbacks such as loss of telecentricity regarding the incident angle of an off-axis ray onto the light receiving plane of the image sensor, lowering of the light amount in the periphery of the display screen, and increase of the outer diameter of the first and second lens groups.

Preferably, in the zoom optical system, the second lens group satisfies the following conditional formula:

$1 < f_2/f_W < 2.5$ where $f_2$ represents the focal length of the second lens group, and $f_W$ represents the composite focal length of the first lens group, the second lens group, and the third lens group at the wide-angle end.

The above arrangement enables to optimize the optical power of the second lens group, which makes it possible to realize a zoom ratio such as two to three times. Further, increase of the moving distance of the second lens group in zooming, and degradation of off-axis performance at the telephoto end can be suppressed. In addition, since increase of error sensitivity of the second lens group can be suppressed, there is no need of adjusting the distance between the lens elements in the second lens group, or the distance between the lens elements in the first through third lens groups.

In the above arrangement, since the ratio of the composite focal length of the second lens group to the composite focal length of the first lens group, the second lens group, and the third lens group at the wide-angle end falls in a desired range, a zoom ratio such as two to three times is obtainable, and degradation of off-axis performance at the telephoto end can be suppressed. Furthermore, since error sensitivity of the second lens group can be reduced, there is no need of adjusting the distance between the lens elements in the second lens group, or the distance between the lens elements in the first through third lens groups, which contributes to production cost reduction.

Preferably, in the zoom optical system, all the lens elements in the first lens group, the second lens group, and the third lens group are made of a plastic material.

Since all the lens elements are made of the plastic material as compared with an optical system with a glass lens element, the weight of the lens groups as a whole can be reduced. Further, since it is possible to produce a number of plastic lens elements at a time, and a die for molding the plastic lens elements has a long useful life, the plastic lens elements are suitable for mass production.

This arrangement enables to reduce the weight of the lens groups as a whole, and to miniaturize the lens driver for driving the lens groups, thereby leading to miniaturization of the optical system as a whole. Thus, production cost of the lens elements can be reduced remarkably, as compared with a case of producing glass lens elements, particularly, aspherical glass lens elements.

Another aspect of the invention is directed to an imaging lens unit comprising: a zoom optical system for forming an optical image of an object, and performing zooming by varying distances between lens groups including a first lens group, a second lens group, and a lens group in an optical axis direction; an image sensor for converting the optical image formed by the zoom optical system into an electrical signal; and a focusing mechanism for focusing by moving the first lens group or the third lens group, wherein the zoom optical system includes in the order from the object side: the first lens group having a negative optical power and being composed of two or more lens elements having at least one positive lens element and at least one negative lens element, all the lens elements in the first lens group being made of a plastic material, the second lens group having a positive optical power and being composed of two or more lens elements having at least one positive lens element and at least one negative lens element, and the third lens group having a positive optical power.

In the optical system comprising, in this order from the object side, the first lens group having a negative optical power, the second lens group having a positive optical power, and the third lens group having a positive optical power, the second lens group is driven primarily for zooming, and the first lens group or the third lens group is driven for focusing in zooming from the wide-angle end to the telephoto end. During the zooming, the second lens group has a mid point where the magnification of the second lens group is substantially equal to the life-size magnification. There is no or less back focus variation in the vicinity of the mid point, no matter how largely the second lens group is attempted to be moved, and accordingly, effective focusing by the second lens group cannot be carried out in the vicinity of the mid point. In view of this, in the above arrangement, the mechanism for driving the first lens group or the third lens group is provided to cause the first (third) lens group to perform focusing.

As mentioned above, in the zoom optical system of a negative-positive-positive three-unit type comprising, in this order from the object side, the first lens group having a negative optical power, the second lens group having a positive optical power, and the third lens group having a positive optical power, focusing is performed by the first lens group or the third lens group, in place of the second lens group having the mid point where the magnification of the second lens group is substantially equal to the life-size magnification. This arrangement provides efficient focusing. Further, the above arrangement enables to retain good close-up shooting performance even with use of an image sensor with a small pixel pitch, and to cancel back focus variation with environmental temperature change.

Yet another aspect of the invention is directed to a digital apparatus comprising the above-mentioned imaging lens unit; and a functioning section for executing a still image shooting and/or a moving image shooting of the object.

The above arrangement enables to realize a digital apparatus such as a mobile phone or a personal digital assistant that enables to perform zooming in still image shooting or moving image shooting of the object, while keeping high resolution.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A zoom optical system for forming an optical image of an object onto a light receiving plane of an image sensor for converting the optical image into an electrical signal, and performing zooming by varying distances between lens groups in an optical axis direction, the zoom optical system comprising the lens groups including in the order from an object side:
    a first lens group having a negative optical power;
    a second lens group having a positive optical power; and
    a third lens group having a positive optical power,
    wherein the first lens group is composed of two or more lens elements including at least one positive lens element and at least one negative lens element, the second lens group is composed of two or more lens elements including at least one positive lens element and at least one negative lens element, and all the lens elements in the first lens group are made of a plastic material, and
    wherein the zoom optical system satisfies the following conditional formula:

$0.15 < h_1/T_w$ where $h_1$ represents an effective optical path radius of a lens surface closest to the object at a wide-angle end, and $T_w$ represents an optical axis distance from an apex of the lens surface closest to the object to the light receiving plane of the image sensor at the wide-angle end when the distance to the object is infinite.

2. The zoom optical system according to claim 1, wherein an exit pupil position of the zoom optical system at a wide-angle end is located closer to the object side with respect to the light receiving plane of the image sensor.

3. A zoom optical system for forming an optical image of an object onto a light receiving plane of an image sensor for converting the optical image into an electrical signal, and performing zooming by varying distances between lens groups in an optical axis direction, the zoom optical system comprising the lens groups including in the order from an object side:
    a first lens group having a negative optical power;
    a second lens group having a positive optical power;
    a third lens group having a positive optical power;
    wherein the first lens group is composed of two or more lens elements including at least one positive lens element and at least one negative lens element, the second lens group is composed of two or more lens elements including at least one positive lens element and at least one negative lens element, and all the lens elements in the first lens group are made of a plastic material;
    wherein the second lens group is composed of a single positive lens element and a single negative lens element; and
    wherein the second lens group satisfies the following conditional formula:

$0.5 < |f_{2n}/f_{2p}| < 1.5$ where $f_{2p}$ represents a focal length of the positive lens element in the second lens group, and $f_{2n}$ represents a focal length of the negative lens element in the second lens group.

4. A zoom optical system for forming an optical image of an object onto a light receiving plane of an image sensor for converting the optical image into an electrical signal, and performing zooming by varying distances between lens groups in an optical axis direction the zoom optical system comprising the lens groups including in the order from an object side:
    a first lens group having a negative optical power;
    a second lens group having a positive optical power; and
    a third lens group having a positive optical power,
    wherein the first lens group is composed of two or more lens elements including at least one positive lens element and at least one negative lens element, the second lens group is composed of two or more lens elements including at least one positive lens element and at least one negative lens element, and all the lens elements in the first lens group are made of a plastic material;
    wherein the distance between the first lens group and the second lens group is decreased, and the distance between the second lens group and the third lens group is increased in zooming from a wide-angle end to a telephoto end; and
    wherein the first lens group and the third lens group are unmoved in zooming from the wide-angle end to the telephoto end.

5. The zoom optical system according to claim 4, wherein the third lens group is moved toward the image sensor in zooming from the wide-angle end to the telephoto end.

6. The zoom optical system according to claim 4, wherein the third lens group is moved toward the image sensor, and then toward the object in zooming from the wide-angle end to the telephoto end.

* * * * *